US008957168B1

(12) United States Patent
Yang et al.

(10) Patent No.: US 8,957,168 B1
(45) Date of Patent: Feb. 17, 2015

(54) METHODS FOR CONTROLLING DUAL CATALYST OLEFIN POLYMERIZATIONS WITH AN ALCOHOL COMPOUND

(71) Applicant: Chevron Phillips Chemical Company LP, The Woodlands, TX (US)

(72) Inventors: Qing Yang, Bartlesville, OK (US); Max P. McDaniel, Bartlesville, OK (US); Tony R. Crain, Niotaze, KS (US); Albert P. Masino, Tulsa, OK (US); Ted H. Cymbaluk, Seabrook, TX (US); John D. Stewart, Friendswood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 13/962,982

(22) Filed: Aug. 9, 2013

(51) Int. Cl.
*C08F 4/649* (2006.01)
*C08F 4/642* (2006.01)
*C08F 4/653* (2006.01)
*C08F 4/6592* (2006.01)
*C08F 10/00* (2006.01)
*C08F 210/14* (2006.01)

(52) U.S. Cl.
CPC ............ *C08F 210/14* (2013.01); *Y10S 526/943* (2013.01)
USPC ........... 526/142; 526/113; 526/114; 526/160; 526/165; 526/348; 526/943

(58) Field of Classification Search
CPC ............... C08F 4/65904; C08F 4/6494; C08F 4/65912; C08F 4/6592; C08F 2420/00; C08F 10/00
USPC .......... 526/113, 114, 142, 160, 165, 348, 943
See application file for complete search history.

(56) References Cited

U.S. PATENT DOCUMENTS

| | | |
|---|---|---|
| 3,242,099 A | 3/1966 | Manyik |
| 3,248,179 A | 4/1966 | Norwood et al. |
| 4,501,885 A | 2/1985 | Sherk et al. |
| 4,588,790 A | 5/1986 | Jenkins, III et al. |
| 4,794,096 A | 12/1988 | Ewen |
| 4,808,561 A | 2/1989 | Welborn, Jr. et al. |
| 4,939,217 A | 7/1990 | Stricklen |
| 5,352,749 A | 10/1994 | DeChellis et al. |
| 5,436,304 A | 7/1995 | Griffin et al. |
| 5,455,314 A | 10/1995 | Burns et al. |
| 5,525,678 A | 6/1996 | Mink et al. |
| 5,565,175 A | 10/1996 | Hottovy et al. |
| 5,575,979 A | 11/1996 | Hanson |
| 5,576,259 A | 11/1996 | Hasegawa et al. |
| 5,670,589 A | 9/1997 | Geerts et al. |
| 5,739,220 A | 4/1998 | Shamshoum et al. |
| 5,807,938 A | 9/1998 | Kaneko et al. |
| 5,919,983 A | 7/1999 | Rosen et al. |
| 6,239,235 B1 | 5/2001 | Hottovy et al. |
| 6,262,191 B1 | 7/2001 | Hottovy et al. |
| 6,569,963 B2 | 5/2003 | Nowlin et al. |
| 6,833,415 B2 | 12/2004 | Kendrick et al. |
| 7,026,494 B1 | 4/2006 | Yang et al. |
| 7,041,617 B2 | 5/2006 | Jensen et al. |
| 7,199,073 B2 | 4/2007 | Martin |
| 7,226,886 B2 | 6/2007 | Jayaratne et al. |
| 7,294,599 B2 | 11/2007 | Jensen et al. |
| 7,312,283 B2 | 12/2007 | Martin et al. |
| 7,517,939 B2 | 4/2009 | Yang et al. |
| 7,601,665 B2 | 10/2009 | McDaniel et al. |
| 7,615,596 B2 | 11/2009 | Burns et al. |
| 7,619,047 B2 | 11/2009 | Yang et al. |
| 7,662,894 B2 * | 2/2010 | Hamed et al. ................ 502/113 |
| 7,884,163 B2 | 2/2011 | McDaniel et al. |
| 7,919,639 B2 | 4/2011 | Murray et al. |
| 8,080,681 B2 | 12/2011 | Murray et al. |
| 8,114,946 B2 | 2/2012 | Yang et al. |
| 8,440,772 B2 | 5/2013 | Yang et al. |
| 8,680,218 B1 | 3/2014 | Yang et al. |
| 2004/0059070 A1 | 3/2004 | Whitte et al. |
| 2005/0085600 A1 | 4/2005 | Ehrman et al. |
| 2013/0345373 A1 | 12/2013 | McDaniel et al. |

OTHER PUBLICATIONS

Hawley's Condensed Chemical Dictionary, 11th Ed., John Wiley & Sons, 1995, 3 pages.
Cotton, et al., Advanced Inorganic Chemistry, 6th Ed., Wiley-Interscience, 1999, 4 pages.
International Search Report and the Written Opinion of the International Searching Authority in PCT/US2014/049770 dated Oct. 30, 2014, 9 pages.

* cited by examiner

*Primary Examiner* — Caixia Lu
(74) *Attorney, Agent, or Firm* — Merchant & Gould

(57) ABSTRACT

Methods for controlling properties of an olefin polymer using an alcohol compound are disclosed. The MI and the HLMI of the polymer can be decreased, and the Mw and the Mz of the polymer can be increased, via the addition of the alcohol compound.

20 Claims, 1 Drawing Sheet

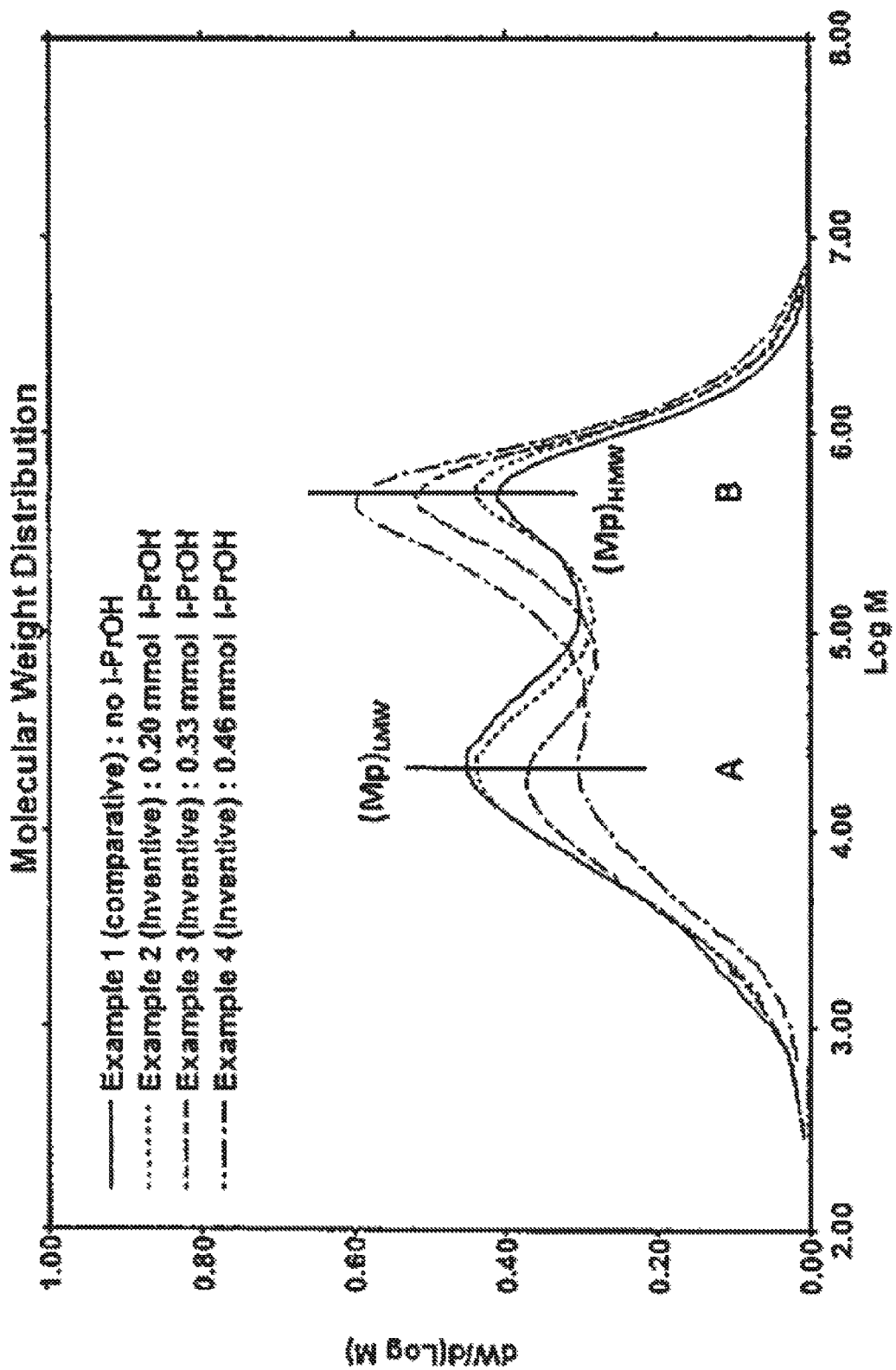

US 8,957,168 B1

METHODS FOR CONTROLLING DUAL CATALYST OLEFIN POLYMERIZATIONS WITH AN ALCOHOL COMPOUND

BACKGROUND OF THE INVENTION

There are various methods that can be employed to adjust or control the melt flow properties and the molecular weight characteristics of an olefin-based polymer produced using a dual metallocene catalyst system. For instance, the catalyst composition and the polymerization reaction conditions can be changed to vary the melt flow properties and the molecular weight characteristics of the polymer that is produced. However, additional methods of adjusting or controlling the polymer properties are needed which do not require changes in the catalyst composition or the polymerization conditions. Accordingly, it is to this end that the present disclosure is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Various processes and methods related to the control of dual catalyst olefin polymerizations are disclosed herein. In one embodiment, a method of controlling a polymerization reaction in a polymerization reactor system is provided herein, and in this embodiment, the method can comprise:

(i) contacting a dual catalyst system with an olefin monomer and an optional olefin comonomer in the polymerization reactor system under polymerization conditions to produce an olefin polymer, wherein the dual catalyst system comprises a first metallocene catalyst component, a second metallocene catalyst component, an activator, and a co-catalyst; and (ii) introducing an amount of an alcohol compound into the polymerization reactor system to reduce a melt index parameter (e.g., melt index (MI), high load melt index (HLMI), etc.) of the olefin polymer, to increase a molecular weight parameter (e.g., weight-average molecular weight (Mw), z-average molecular weight (Mz), etc.) of the olefin polymer, or to reduce a melt index parameter and increase a molecular weight parameter of the olefin polymer.

A process for producing an olefin polymer with a target melt index parameter (e.g., MI, HLMI, etc.), a target molecular weight parameter (e.g., Mw, Mz, etc.), or a target melt index parameter and a target molecular weight parameter, is provided herein, and in this embodiment, the process can comprise:

(a) contacting a dual catalyst system with an olefin monomer and an optional olefin comonomer in a polymerization reactor system under polymerization conditions, wherein the dual catalyst system comprises a first metallocene catalyst component, a second metallocene catalyst component, an activator, and a co-catalyst; and (b) controlling an amount of an alcohol compound introduced into the polymerization reactor system to produce the olefin polymer with the target melt index parameter (e.g., MI, HLMI, etc.), the target molecular weight parameter (e.g., Mw, Mz, etc.), or the target melt index parameter and the target molecular weight parameter.

In these methods and processes, the melt index parameters, such as MI and HLMI, of the olefin polymer can decrease as the amount of the alcohol compound added to the polymerization reactor system is increased. Further, the molecular weight parameters, such as Mw and Mz, of the olefin polymer can increase as the amount of the alcohol compound added to the polymerization reactor system is increased.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

BRIEF DESCRIPTION OF THE FIGURE

The FIGURE presents a plot of the molecular weight distribution as a function of the amount of isopropanol for Examples 1-4.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are often described in terms of "comprising" various components or steps, the compositions and methods can also "consist essentially of" or "consist of" the various components or steps, unless stated otherwise.

The terms "a," "an," and "the" are intended to include plural alternatives, e.g., at least one. For instance, the disclosure of "an activator," "an olefin comonomer," etc., is meant to encompass one, or mixtures or combinations of more than one, activator, olefin comonomer, etc., unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. A general reference to pentane, for example, includes n-pentane, 2-methylbutane, and 2,2-dimethylpropane; and a general reference to a butyl group includes a n-butyl group, a sec-butyl group, an iso-butyl group, and a t-butyl group.

Also, unless otherwise specified, any carbon-containing group or compound for which the number of carbon atoms is not specified can have 1, 2, 3, 4, 5, 6, 7, 8, 9, 10, 11, 12, 13, 14, 15, 16, 17, 18, 19, or 20 carbon atoms, or any range or combination of ranges between these values. For example, unless otherwise specified, any carbon-containing group or compound can have from 1 to 20 carbon atoms, from 1 to 18 carbon atoms, from 1 to 12 carbon atoms, from 1 to 8 carbon atoms, from 2 to 20 carbon atoms, from 2 to 12 carbon atoms, from 2 to 8 carbon atoms, or from 2 to 6 carbon atoms, and the like. Moreover, other identifiers or qualifying terms can be utilized to indicate the presence of, or absence of, a particular substituent, a particular regiochemistry, or stereochemistry, or the presence or absence of a branched underlying structure or backbone. Any specific carbon-containing group is limited according to the chemical and structural requirements for that specific group, as understood by one of ordinary skill.

Other numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. As a representative example, Applicants disclose that a weight ratio of the higher molecular weight component to the lower molecular weight component can be in a range from about 1:10 to about 10:1 in certain embodiments. By a disclosure that the weight ratio of the higher molecular weight component to the lower molecular weight component can be in a range from about 1:10 to about 10:1, Applicants intend to recite that the weight ratio can be any weight ratio within the range and, for example, can be equal to about 1:10, about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1, about 9:1, or about 10:1. Additionally, the weight ratio can be within any range from about 1:10 to about 10:1 (for example, the weight ratio can be in a range from about 1:2 to about 2:1), and this also includes any combination of ranges between about 1:10 and 10:1. Likewise, all other ranges disclosed herein should be interpreted in a manner similar to these examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The term "substituted" when used to describe a group or a chain of carbon atoms, for example, when referring to a substituted analog of a particular group or chain, is intended to describe or group or chain wherein any non-hydrogen moiety formally replaces a hydrogen in that group or chain, and is intended to be non-limiting. A group or chain also can be referred to herein as "unsubstituted" or by equivalent terms such as "non-substituted," which refers to the original group or chain. "Substituted" is intended to be non-limiting and can include hydrocarbon substituents as specified and as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, among other groups as members.

The term "polymer" is used herein generically to include olefin homopolymers, copolymers, terpolymers, and so forth. A copolymer can be derived from an olefin monomer and one olefin comonomer, while a terpolymer can be derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also is meant to include all molecular weight polymers, and is inclusive of lower molecular weight polymers or oligomers. Applicants intend for the term "polymer" to encompass oligomers derived from any olefin monomer disclosed herein (as well from an olefin monomer and one olefin comonomer, an olefin monomer and two olefin comonomers, and so forth).

In like manner, the scope of the term "polymerization" includes homopolymerization, copolymerization, terpolymerization, etc., as well as processes that might also be referred to as oligomerization processes. Therefore, a copolymerization process can involve contacting an olefin monomer (e.g., ethylene) and an olefin comonomer (e.g., 1-hexene) to produce an olefin copolymer.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound(s), any olefin monomer used to prepare a precontacted mixture, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The terms "contact product," "contacting," and the like, are used herein to describe compositions wherein the components are contacted together in any order, in any manner, and for any length of time. For example, the components can be contacted by blending or mixing. Further, unless otherwise specified, the contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Likewise, "contacting" two or more components can result in a reaction product or a reaction mixture. Consequently, depending upon the circumstances, a "contact product" can be a mixture, a reaction mixture, or a reaction product.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

DETAILED DESCRIPTION OF THE INVENTION

Disclosed herein are methods and processes directed to controlling dual catalyst olefin polymerizations in a polymerization reactor system via the addition of an alcohol compound. In these methods and processes, the amount of the alcohol compound added to the reactor system can be used to adjust a melt index parameter (e.g., MI, HLMI, etc.) of the olefin polymer, and additionally or alternatively, can be used to adjust a molecular weight parameter (e.g., Mw, Mz, etc.) of the olefin polymer. The polymerization reaction can be conducted in a reactor system which can contain one reactor, or alternatively, two or more reactors in series or parallel.

For example, in one embodiment, a method of controlling a polymerization reaction in a polymerization reactor system is disclosed. In this embodiment, the method can comprise:

(i) contacting a dual catalyst system with an olefin monomer and an optional olefin comonomer in the polymerization reactor system under polymerization conditions to produce an olefin polymer, wherein the dual catalyst system comprises a first metallocene catalyst component, a second metallocene catalyst component, an activator, and a co-catalyst; and (ii) introducing an amount of an alcohol compound into the polymerization reactor system to (I) reduce a melt index parameter (e.g., MI, HLMI, etc.) of the olefin polymer; (II) increase a molecular weight parameter (e.g., Mw, Mz, etc.) of the olefin polymer; or (III) reduce a melt index parameter and increase a molecular weight parameter of the olefin polymer.

Thus, the addition of the alcohol compound (e.g., increasing the amount of the alcohol compound) can decrease a melt index parameter of the olefin polymer. Illustrative and non-limiting examples of melt index parameters are MI (g/10 min, ASTM D1238, 190° C., and 2.16 kg weight) and HLMI (g/10 min, ASTM D1238, 190° C. and 21.6 kg weight). Additionally or alternatively, the addition of the alcohol compound (e.g., increasing the amount of the alcohol compound) can increase a molecular weight parameter of the olefin polymer. Illustrative and non-limiting examples of molecular weight parameters are Mw and Mz (in g/mol, determined using gel permeation chromatography (GPC) or other suitable analytical procedure).

In another embodiment, a process for producing an olefin polymer with a target melt index parameter (e.g., MI, HLMI, etc.), a target molecular weight parameter (e.g., Mw, Mz, etc.), or a target melt index parameter and a target molecular weight parameter, is disclosed. In this embodiment, the process can comprise:

(a) contacting a dual catalyst system with an olefin monomer and an optional olefin comonomer in a polymerization reactor system under polymerization conditions, wherein the dual catalyst system comprises a first metallocene catalyst component, a second metallocene catalyst component, an activator, and a co-catalyst; and (b) controlling an amount of an alcohol compound introduced into the polymerization reactor system to produce the olefin polymer with the target melt index parameter (e.g., MI, HLMI, etc.), the target molecular weight parameter (e.g., Mw, Mz, etc.), or the target melt index parameter and the target molecular weight parameter.

Thus, the addition of the alcohol compound (e.g., increasing the amount of the alcohol compound) can be used to produce an olefin polymer with a target melt index parameter, or a target molecular weight parameter, or both.

In these methods and processes, the alcohol compound can be introduced (e.g., added, injected, etc.) into the polymerization reactor system by any suitable means, for instance, alone, or with a carrier (e.g., a carrier gas, a carrier liquid, etc.). The alcohol compound can be introduced into the polymerization reactor system at any suitable location within the reactor system. In one embodiment, the alcohol compound can be added directly into a polymerization reactor within the polymerization reactor system, while in another embodiment, the alcohol compound can be introduced into the polymerization reaction system at a feed or inlet location other than directly into a polymerization reactor, for example, in a recycle stream. In some embodiments, the alcohol compound can be added to the reactor by itself, while in other embodiments, the alcohol compound can be added to the reactor with a carrier or solvent, non-limiting examples of which can include, but are not limited to, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, and the like, or combinations thereof. In certain embodiments, the alcohol compound can be added to the reactor with an olefin monomer/comonomer, such as 1-butene, 1-hexene, or 1-octene, and the like. In particular embodiments contemplated herein, the alcohol compound can be added to the polymerization reactor system with the dual catalyst system. Additional feed options for a polymerization reactor system are described in U.S. Pat. No. 7,615,596, the disclosure of which is incorporated herein by reference in its entirety.

Generally, the features of the methods and processes disclosed herein (e.g., the dual catalyst system, the first metallocene catalyst component, the second metallocene component, the activator, the co-catalyst, the olefin monomer, the olefin comonomer, the polymerization conditions, the polymerization reactor system, the alcohol compound, the amount of the alcohol compound, the melt index parameter, the molecular weight parameter, among others) are independently described herein, and these features can be combined in any combination to further describe the disclosed processes and methods.

In certain methods and processes disclosed herein, a dual catalyst system can be contacted with an olefin monomer and optionally an olefin comonomer in the polymerization reactor system, and an alcohol compound can be added to the reactor system. As would be recognized by one of skill in the art, additional components can be introduced into the polymerization reactor system in addition to these recited components, and such unrecited components are encompassed herein. For instance, in the operation of a polymerization reactor system—depending, of course, on the polymerization reactor type, the desired olefin polymer, etc., among other factors—solvents, diluents, fluidizing gases, recycle streams, etc., also can be added or introduced into the polymerization reactor and polymerization reactor system.

The weight ratio of the first metallocene catalyst component to the second metallocene catalyst component in the dual catalyst system generally is not limited to any particular range of weight ratios. Nonetheless, in some embodiments, the weight ratio of the first metallocene catalyst component to the second metallocene catalyst component can be in a range of from about 1:100 to about 100:1, from about 1:50 to about 50:1, from about 1:25 to about 25:1, from about 1:10 to about 10:1, or from about 1:5 to about 5:1. Accordingly, suitable ranges for the weight ratio of the first metallocene catalyst component to the second metallocene catalyst component can include, but are not limited to, from about 1:15 to about 15:1, from about 1:10 to about 10:1, from about 1:8 to about 8:1, from about 1:5 to about 5:1, from about 1:4 to about 4:1, from about 1:3 to about 3:1, from about 1:2 to about 2:1, from about 1:1.8 to about 1.8:1, from about 1:1.5 to about 1.5:1, from about 1:1.3 to about 1.3:1, from about 1:1.25 to about 1.25:1, from about 1:1.2 to about 1.2:1, from about 1:1.15 to about 1.15:1, from about 1:1.1 to about 1.1:1, or from about 1:1.05 to about 1.05:1, and the like.

Consistent with embodiments disclosed herein, the weight ratio of the first metallocene catalyst component to the second metallocene catalyst component can be held substantially constant (e.g., within +/−5%), for example, for the production of a particular polymer grade. In such circumstances, the addition of the alcohol compound can be used to control, adjust, fine-tune, etc., the production and properties of that particular polymer grade, without having to vary the catalyst composition.

Optionally, if additional control parameters for the dual catalyst polymerization process are desired other than the use of an alcohol compound, the methods and processes disclosed herein can further comprise a step of adjusting the weight ratio of the first metallocene catalyst component to the second metallocene catalyst component.

In some embodiments, the polymerization conditions can be held substantially constant (e.g., within +/−5%), for example, for the production of a particular polymer grade. Representative polymerization conditions include absolute temperature, gauge pressure, residence time, % solids, and the like. As above, in such circumstances, the addition of the alcohol compound can be used to control, adjust, fine-tune, etc., the production and properties of that particular polymer grade.

Optionally, if additional control parameters for the dual catalyst polymerization process are desired other than the use of an alcohol compound, the methods and processes disclosed herein can further comprise a step of adjusting at least one polymerization condition (e.g., temperature, pressure, residence time, etc.).

Unexpectedly, in these methods and processes, melt index parameters such as MI and HLMI of the olefin polymer can decrease as the amount of the alcohol compound added to the polymerization reactor system is increased. Also unexpectedly, molecular weight parameters such as Mw and Mz of the olefin polymer can increase as the amount of the alcohol compound added to the polymerization reactor system is increased. The alcohol compound can be added to the polymerization reactor system (e.g., into a polymerization reactor) alone, with a carrier, with the dual catalyst system, etc. The amount of the alcohol compound added to the reactor system is not particularly limited, so long as the amount of the alcohol compound added to the reactor system is sufficient to impact at least one of the MI, HLMI, Mw, and Mz of the olefin polymer as described herein, and does not adversely impact the catalyst activity or polymer production rate in a significant manner (e.g., 20%+reduction in catalyst activity, polymer production rate, or both). While not being limited thereto, the amount of the alcohol compound added typically can be in a molar ratio range of moles of hydroxyl (—OH) groups of the alcohol compound to the total moles of the first metallocene catalyst component and the second metallocene catalyst component from about 10:1 to about 1000:1. This molar ratio is based on the respective amounts of hydroxyl groups of the alcohol compound, the first metallocene catalyst component, and the second metallocene catalyst component fed into the reactor system (e.g., into a polymerization reactor). As a non-limiting example of a 50:1 molar ratio, in a continuous polymerization reactor system, the total amount of the first and second metallocene catalyst components fed into the reactor(s) per time interval can be "Y" moles/hour; thus, the amount of the alcohol compound fed into the reactor(s) would be equal to "50Y" moles/hour (moles of hydroxyl groups) for a 50:1 molar ratio.

In some embodiments, this molar ratio (moles of hydroxyl groups of the alcohol compound to total moles of metallocene components) can be in a range from about 10:1 to about 1000:1, from about 10:1 to about 750:1, from about 10:1 to about 500:1, from about 20:1 to about 1000:1, from about 20:1 to about 750:1, from about 20:1 to about 500:1, from about 20:1 to about 250:1, from about 20:1 to about 200:1, or from about 20:1 to about 100:1. In particular embodiments considered herein, the molar ratio can be in a range from about 25:1 to about 1000:1, from about to about 25:1 to about 500:1, from about 25:1 to about 100:1, from about 50:1 to about 1000:1, from about 100:1 to about 1000:1, or from about 50:1 to about 500:1.

Unexpectedly, in the disclosed methods and processes, the ratio of Mz/Mw of the olefin polymer can decrease as the amount of the alcohol compound added to the polymerization reactor system is increased. However, also unexpectedly, the addition of the alcohol compound can have substantially no effect on the Mn of the olefin polymer. In this regard, "substantially" no effect (substantially no change in Mn) means that the Mn after addition of the alcohol compound is within +/−20% of the Mn prior to addition of the alcohol compound. In some embodiments, the Mn can be within +/−10% or, alternatively, +/−5%.

Moreover, in some embodiments, the step of introducing the alcohol compound into the polymerization reactor system, unexpectedly, can have substantially no effect (within +/−20%; in some embodiments, within +/−10% or, alternatively, +/−5%) on the activity of the dual catalyst system (or, for instance, can have substantially no effect on the production rate of the olefin polymer). As one of skill in the art would readily understand, an excess of the alcohol compound, as compared to certain components of the dual catalyst system, can drastically reduce the catalyst activity and polymer production rate and, eventually, can "kill" the reaction. Thus, the practical maximum amount of the alcohol compound added to the polymerization reactor system is limited.

In an embodiment, the alcohol compound can be added into the polymerization reactor system continuously. For instance, the alcohol compound can be added to the reactor whenever the olefin monomer or the metallocene catalyst components, or both, are added to the reactor. Alternatively, the alcohol compound can be added periodically, on an as-needed basis, or pulsed to the reactor. Intermittent addition to a polymerization reactor is disclosed, for instance, in U.S.

Pat. No. 5,739,220 and U.S. Patent Publication No. 2004/0059070, the disclosures of which are incorporated herein by reference in their entirety.

The addition of the alcohol compound can be used to produce olefin polymers having various melt flow rate and molecular weight properties. For example, the MI of the olefin polymer (e.g., an ethylene/α-olefin copolymer) can be less than about 50, less than about 25, less than about 10, or less than about 5 g/10 min. Contemplated ranges for the MI of olefin polymers produced by the methods and processes disclosed herein can include, but are not limited to, from 0 to about 25 g/10 min, from 0 to about 5 g/10 min, from 0 to about 1 g/10 min, from 0 to about 0.5 g/10 min, from about 0.005 to about 5 g/10 min, from about 0.005 to about 2 g/10 min, from about 0.005 to about 1 g/10 min, from about 0.01 to about 20 g/10 min, from about 0.01 to about 2 g/10 min, from about 0.01 to about 1 g/10 min, from about 0.05 to about 15 g/10 min, from about 0.05 to about 5 g/10 min, from about 0.05 to about 1 g/10 min, from about 0.05 to about 0.5 g/10 min, from about 0.1 to about 2 g/10 min, from about 0.1 to about 1 g/10 min, or from about 0.1 to about 0.8 g/10 min.

The HLMI of the olefin polymer produced can be, for example, less than about 200, less than about 100, less than about 50, or less than about 25 g/10 min. Contemplated ranges for the HLMI of olefin polymers produced by the methods and processes disclosed herein can include, but are not limited to, from 0 to about 100 g/10 min, from 0 to about 50 g/10 min, from 0 to about 25 g/10 min, from 0 to about 20 g/10 min, from about 0.005 to about 100 g/10 min, from about 0.005 to about 50 g/10 min, from about 0.005 to about 25 g/10 min, from about 0.01 to about 100 g/10 min, from about 0.01 to about 75 g/10 min, from about 0.01 to about 10 g/10 min, from about 0.1 to about 50 g/10 min, from about 0.1 to about 20 g/10 min, from about 0.1 to about 15 g/10 min, from about 0.1 to about 10 g/10 min, from about 0.5 to about 100 g/10 min, from about 0.5 to about 25 g/10 min, or from about 1 to about 15 g/10 min.

In some embodiments, the weight-average molecular weight (Mw) of the olefin polymer produced by the methods and processes disclosed herein can be in a range from about 70,000 to about 600,000 g/mol, from about 100,000 to about 600,000 g/mol, or from about 100,000 to about 500,000 g/mol. In other embodiments, the Mw can be in range from about 100,000 to about 400,000 g/mol, from about 150,000 to about 475,000 g/mol, from about 200,000 to about 500,000 g/mol, from 200,000 to about 400,000 g/mol, from about 225,000 to about 400,000 g/mol, or from about 250,000 to about 450,000 g/mol. Suitable ranges for the number-average molecular weight (Mn) of the olefin polymer can include, but are not limited to, from about 5,000 to about 50,000 g/mol, from about 5,000 to about 40,000 g/mol, from about 5,000 to about 30,000 g/mol, from about 6,000 to about 25,000 g/mol, from about 6,000 to about 20,000 g/mol, from about 7,000 to about 30,000 g/mol, from about 8,000 to about 25,000 g/mol, from about 9,000 to about 25,000 g/mol, or from about 9,000 to about 22,000 g/mol. Further, suitable ranges for the z-average molecular weight (Mz) of the olefin polymer can include, but are not limited to, from about 700,000 to about 3,000,000 g/mol, from about 800,000 to about 3,000,000 g/mol, from about 1,000,000 to about 3,000,000 g/mol, from about 700,000 to about 2,500,000 g/mol, from about 800,000 to about 2,500,000 g/mol, from about 1,000,000 to about 2,500,000 g/mol, from about 800,000 to about 2,000,000 g/mol, or from about 1,000,000 to about 2,000,000 g/mol.

In some embodiments, the Mw/Mn ratio of the olefin polymer produced by the methods and processes disclosed herein can be in a range from about 5 to about 50, from about 5 to about 40, from about 5 to about 35, from about 8 to about 30, from about 10 to about 40, from about 10 to about 35, from about 12 to about 35, from about 15 to about 35, from about 18 to about 30, from about 15 to about 30, from about 18 to about 30, from about 7 to about 45, from about 8 to about 40, from about 9 to about 35, from about 10 to about 30, or from about 12 to about 28. Likewise, in some embodiments, the Mz/Mw ratio of the olefin polymer can be in a range from about 3 to about 7, from about 3 to about 6, from about 3 to about 5.5, from about 3.5 to about 7, from about 3.5 to about 6, from about 3.5 to about 5.5, from about 3.5 to about 5, from about 3.8 to about 6.5, from about 3.8 to about 6, from about 3.8 to about 5.5, from about 3.8 to about 5.3, from about 3.8 to about 5, or from about 3.8 to about 4.8.

In one embodiment, no hydrogen is added to the polymerization reactor system. As one of ordinary skill in the art would recognize, hydrogen can be generated in-situ by the first metallocene catalyst component, the second metallocene catalyst component, or both catalyst components, during the dual catalyst olefin polymerization process. In this embodiment, there is no "added hydrogen" to the reactor system.

Although not required, however, hydrogen can be added to the polymerization reactor system in certain embodiments. Optionally, for instance, the methods and processes provided herein can further comprise a step of adding hydrogen to the polymerization reactor system to adjust the molecular weight parameter (e.g., Mw, Mz, etc.) of the olefin polymer, to adjust the melt index parameter (MI, HLMI, etc.) of the olefin polymer, or to adjust both the molecular weight parameter and the melt index parameter of the olefin polymer, if desired. Generally, the step of adding hydrogen can decrease the Mw, decrease the Mz, increase the MI, or increase the HLMI, or any combination thereof, of the polymer. Moreover, the addition of hydrogen also can decrease the Mn of the polymer.

In embodiments where hydrogen is added to the polymerization reactor system, the hydrogen addition can be held substantially constant (e.g., within +/−20%), for example, for the production of a particular polymer grade. For example, the ratio of hydrogen to the olefin monomer in the polymerization process can be controlled, often by the feed ratio of hydrogen to the olefin monomer entering the reactor. Further, the addition of comonomer (or comonomers) can be, and generally is, substantially constant throughout the polymerization run for a particular copolymer grade. However, in other embodiments, it is contemplated that monomer, comonomer (or comonomers), or hydrogen, or combinations thereof, can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The olefin polymer produced using the dual catalyst system can contain a higher molecular weight component and a lower molecular weight component in certain embodiments disclosed herein. The weight ratio of the higher molecular weight component to the lower molecular weight component generally is not limited to any particular range of weight ratios. Nonetheless, in some embodiments, the weight ratio of the higher molecular weight component to the lower molecular weight component can be in a range of from about 1:100 to about 100:1, from about 1:50 to about 50:1, from about 1:25 to about 25:1, from about 1:10 to about 10:1, or from about 1:5 to about 5:1. Accordingly, suitable ranges for the weight ratio of the higher molecular weight component to the lower molecular weight component can include, but are not limited to, from about 1:15 to about 15:1, from about 1:10 to about 10:1, from about 1:8 to about 8:1, from about 1:5 to about 5:1, from about 1:4 to about 4:1, from about 1:3 to about 3:1, from about 1:2 to about 2:1, from about 1:1.8 to about 1.8:1, from about 1:1.5 to about 1.5:1, from about 1:1.3 to about 1.3:1, from about 1:1.25 to about 1.25:1, from about 1:1.2 to about 1.2:1, from about 1:1.15 to about 1.15:1, from about 1:1.1 to about 1.1:1, or from about 1:1.05 to about 1.05:1, and the like.

In the disclosed methods and processes, the MI (or HLMI, or both) of the olefin polymer can decrease, the Mw (or Mz, or both) of the olefin polymer can increase, or both the melt index parameter can decrease and the molecular weight parameter can increase, as the amount of the alcohol compound added to the polymerization reactor system is increased. For olefin polymers having a higher molecular weight component and a lower molecular weight component, unexpectedly, the introduction of the alcohol compound into the polymerization reactor system can increase the weight ratio of the higher molecular weight component to the lower molecular weight component.

Moreover, the addition of the alcohol compound into the polymerization reactor system can have substantially no effect on the peak molecular weight (Mp) of the lower molecular weight component of the olefin polymer. Additionally or alternatively, in certain embodiments, the addition of the alcohol compound into the polymerization reactor system can have substantially no effect on the peak molecular weight (Mp) of the higher molecular weight component of the olefin polymer. In this regard, "substantially" no effect (substantially no change in Mp) means that the peak molecular weight after addition of the alcohol compound is within +/−20% of the peak molecular weight prior to addition of the alcohol compound. In some embodiments, the peak molecular weights can be within +/−10% or, alternatively, +/−5%.

For the production of a particular grade of an olefin polymer, with certain desired polymer properties, a target MI (or HLMI, or both) of the olefin polymer can be established. Thus, when the particular polymer grade is produced, variables can be adjusted in order to achieve the targeted MI (or HLMI, or both). Accordingly, in some embodiments, the processes and methods provided herein optionally can further comprise the steps of determining (or measuring) the MI (or HLMI, or both) of the olefin polymer, and then adjusting the amount of the alcohol compound introduced into the polymerization reactor system based on the difference between the measured MI (or HLMI, or both) and the target MI (or HLMI, or both). As a representative example, if the measured MI (or HLMI, or both) is higher than that of the target MI (or HLMI, or both) for the production of a particular grade of olefin polymer, then the alcohol compound can be added at an amount appropriate to make the measured MI (or HLMI, or both) equivalent to that of the target MI (or HLMI, or both). For instance, the feed rate of the alcohol compound can be increased to reduce the MI (or HLMI, or both) of the olefin polymer.

Likewise, for the production of a particular grade of an olefin polymer, with certain desired polymer properties, a target Mw (or Mz, or both) of the olefin polymer can be established. Thus, when the particular polymer grade is produced, variables can be adjusted in order to achieve the targeted Mw (or Mz, or both). Accordingly, in some embodiments, the processes and methods provided herein optionally can further comprise the steps of determining (or measuring) the Mw (or Mz, or both) of the olefin polymer, and then adjusting the amount of the alcohol compound introduced into the polymerization reactor system based on the difference between the measured Mw (or Mz, or both) and the target Mw (or Mz, or both). As a representative example, if the measured Mw (or Mz, or both) is less than that of the target Mw (or Mz, or both) for the production of a particular grade of olefin polymer, then the alcohol compound can be added at an amount appropriate to make the measured Mw (or Mz, or both) equivalent to that of the target Mw (or Mz, or both). For instance, the feed rate of the alcohol compound can be increased to increase the Mw (or Mz, or both) of the olefin polymer.

Consistent with embodiments disclosed herein, optionally and as-needed, various polymerization conditions or process variables can be adjusted or controlled during the operation of a polymerization reactor system, and such conditions or variables can include, but are not limited to, reaction temperature, reactor pressure, residence time, catalyst system flow rate into the reactor, monomer flow rate (and comonomer, if employed) into the reactor, olefin polymer output rate, recycle rate, hydrogen flow rate (if employed), reactor cooling status, slurry density, circulation pump power, and the like.

In each of the methods and process disclosed herein, the melt index parameter (e.g., MI, HLMI) of the olefin polymer can decrease, the molecular weight parameter (e.g., Mw, Mz) of the olefin polymer can increase, or the melt index parameter can decrease and the molecular weight parameter can increase, as the amount of the alcohol compound added to the polymerization reactor system increases.

Alcohol Compounds

Alcohol compounds suitable for use herein can include, for example, mono-ols (monoalcohols), diols, triols, or polyols, as well as combinations thereof. Moreover, suitable alcohol compounds can be linear or branched, and can be a primary alcohol, a secondary alcohol, or a tertiary alcohol. Typically, the alcohol compound can comprise a hydrocarbyl alcohol, although this is not a requirement. For instance, the alcohol compound can comprise an alkyl alcohol, a cycloalkyl alcohol, an aryl alcohol, an arylalkyl alcohol, and the like, as well as combinations thereof.

The number of carbon atoms in the alcohol compound is not particularly limited, although in some embodiments, the alcohol compound can comprise a $C_1$ to $C_{32}$ alcohol; alternatively, a $C_1$ to $C_{18}$ alcohol; alternatively, a $C_1$ to $C_{12}$ alcohol; alternatively, a $C_1$ to $C_8$ alcohol; alternatively, a $C_1$ to $C_4$ alcohol; alternatively, a $C_2$ to $C_{12}$ alcohol; or alternatively, a $C_2$ to $C_6$ alcohol. Representative and non-limiting examples of suitable alcohol compounds (e.g., mono-ol compounds) can include the following: methanol, ethanol, propanol (e.g., isopropanol, n-propanol), butanol (e.g., n-butanol, isobutanol), pentanol, hexanol, heptanol, octanol, decanol, hexadecanol, cyclohexanol, phenol, benzyl alcohol, etc., as well as combinations thereof. In one embodiment, the alcohol compound can comprise methanol, ethanol, propanol (e.g., isopropanol, n-propanol), butanol (e.g., n-butanol, isobutanol), pentanol, hexanol, heptanol, octanol, decanol, hexadecanol, and the like, or a combination thereof. In another embodiment, the alcohol compound can comprise cyclohexanol, phenol, benzyl alcohol, and the like, or a combination thereof. In yet another embodiment, the alcohol compound can comprise methanol, ethanol, propanol (e.g., isopropanol, n-propanol), butanol (e.g., n-butanol, isobutanol), pentanol, hexanol, heptanol, octanol, and the like, or a combination thereof. In still another embodiment, the alcohol compound can comprise methanol, ethanol, propanol (e.g., isopropanol, n-propanol), butanol (e.g., n-butanol, isobutanol), and the like, or a combination thereof, or alternatively, ethanol, propanol (e.g., isopropanol, n-propanol), butanol (e.g., n-butanol, isobutanol), and the like, or a combination thereof.

In certain embodiments, the alcohol compound can comprise a diol, illustrative examples of which can include, but are not limited to, methanediol, ethylene glycol, propylene glycol, butanediol (e.g., 1,4-butanediol), pentanediol, octanediol, bisphenol A, and the like, as well as any combination thereof. Accordingly, the alcohol compound can comprise ethylene glycol, propylene glycol, or both, in some embodiments; alternatively, methanediol; alternatively, ethylene glycol; alternatively, propylene glycol; alternatively, butanediol (e.g., 1,4-butanediol); alternatively, pentanediol; alternatively, octanediol; or alternatively, bisphenol A.

In other embodiments, the alcohol compound can comprise a triol, a polyol, or combinations thereof, illustrative examples of which can include, but are not limited to, glycerol, benzenetriol, erythritol, xylitol, mannitol, and the like, as well as combinations thereof. Accordingly, the alcohol compound can comprise glycerol in some embodiments; alternatively, benzenetriol; alternatively, erythritol; alternatively, xylitol; or alternatively, mannitol.

The alcohol compound, in accordance with an embodiment disclosed herein, can have a boiling point of at least 60° C., such as, for example, a boiling point of at least 65° C., a boiling point of at least 70° C., or a boiling point of at least 85° C. Alcohol compounds having boiling points of at least 100° C., or at least 150° C., can be employed as well. Yet, in another embodiment, the alcohol compound can have a boiling point in the 60° C. to 400° C. range; alternatively, a boiling point in the 60° C. to 350° C. range; alternatively, a boiling point in the 70° C. to 300° C. range; alternatively, a boiling point in the 80° C. to 275° C. range; alternatively, a boiling point in the 80° C. to 250° C. range; alternatively, a boiling point in the 100° C. to 350° C. range; alternatively, a boiling point in the 125° C. to 350° C. range; alternatively, a boiling point in the 125° C. to 300° C. range; or alternatively, a boiling point in the 150° C. to 275° C. range.

The alcohol compound can be miscible with or soluble in a hydrocarbon solvent. For instance, the alcohol compound can be miscible with or soluble in a hydrocarbon solvent comprising (or consisting essentially of, or consisting of) a $C_3$ to $C_{10}$ hydrocarbon; alternatively, a $C_3$ to $C_{10}$ aliphatic hydrocarbon; alternatively, a $C_3$ to $C_8$ aliphatic hydrocarbon; or alternatively, a $C_4$ to $C_8$ aliphatic hydrocarbon. The aliphatic hydrocarbon can be cyclic or acyclic, and can be linear or branched, unless otherwise specified. Illustrative aliphatic hydrocarbon solvents can include, but are not limited to, propane, isobutane, n-butane, n-pentane, isopentane, neopentane, n-hexane, heptane, octane, cyclohexane, cycloheptane, methylcyclohexane, methylcycloheptane, and the like, including mixtures or combinations thereof.

Furthermore, the alcohol compound can be miscible with or soluble in a hydrocarbon solvent comprising (or consisting essentially of, or consisting of) a $C_6$ to $C_{10}$ aromatic hydrocarbon or, alternatively, a $C_6$ to $C_8$ aromatic hydrocarbon. Illustrative aromatic hydrocarbon solvents can include, but are not limited to, benzene, toluene, xylene, ethylbenzene, and the like, including mixtures or combinations thereof.

In one embodiment, the alcohol compound can be miscible with or soluble in propane, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, or a mixture thereof. In another embodiment, the alcohol compound can be miscible with or soluble in propane, cyclohexane, isobutane, n-butane, n-pentane, isopentane, neopentane, n-hexane, or a mixture thereof. In yet another embodiment, the alcohol compound can be miscible with or soluble in propane; alternatively, isobutane; alternatively, n-butane; alternatively, n-pentane; alternatively, isopentane; alternatively, neopentane; alternatively, n-hexane; alternatively, heptane; alternatively, octane; alternatively, cyclohexane; alternatively, cycloheptane; alternatively, methylcyclohexane; alternatively, methylcycloheptane; alternatively, benzene; alternatively, toluene; alternatively, xylene; or alternatively, ethylbenzene.

Applicants also contemplate that the alcohol compound can be miscible with or soluble in an ISOPAR® mixed aliphatic hydrocarbon solvent, such as, for example, ISOPAR® C, ISOPAR® E, ISOPAR® G, ISOPAR® H, ISOPAR® L, ISOPAR® M, or a mixture thereof.

The alcohol compound, in certain embodiments, can be a liquid (under atmospheric pressure) at a temperature in a range from 50° C. to 400° C.; alternatively, in a range from 50° C. to 200° C.; alternatively, in a range from 50° C. to 150° C.; alternatively, in a range from 50° C. to 125° C.; alternatively, in a range from 75° C. to 250° C.; alternatively, in a range from 75° C. to 175° C.; alternatively, in a range from 75° C. to 125° C.; alternatively, in a range from 60° C. to 250° C.; or alternatively, in a range from 60° C. to 150° C.

Catalyst Systems

In some embodiments, the dual catalyst system can comprise a first metallocene catalyst component and a second metallocene catalyst component, while in other embodiments, the dual catalyst system can comprise a first metallocene catalyst component, a second metallocene catalyst component, an activator, and a co-catalyst. The first metallocene catalyst component and the second metallocene catalyst component independently can comprise, for example, a transition metal (one or more than one) from Groups IIIB-VIIIB of the Periodic Table of the Elements. In one embodiment, the first metallocene catalyst component and the second metallocene catalyst component independently can comprise a Group III, IV, V, or VI transition metal, or a combination of two or more transition metals. The first metallocene catalyst component and the second metallocene catalyst component independently can comprise chromium, titanium, zirconium, hafnium, vanadium, or a combination thereof, or can comprise titanium, zirconium, hafnium, or a combination thereof, in other embodiments. Accordingly, the first metallocene catalyst component and the second metallocene catalyst component independently can comprise titanium, or zirconium, or hafnium, either singly or in combination.

In an embodiment, the first metallocene catalyst component can produce the lower molecular weight component of the olefin polymer, and the second metallocene catalyst component can produce the higher molecular weight component of the olefin polymer. These component terms are relative, are used in reference to each other, and are not limited to the actual molecular weights of the respective components. While not being limited thereto, the first metallocene catalyst component can comprise an unbridged metallocene; alternatively, an unbridged zirconium or hafnium based metallocene compound, or an unbridged zirconium, hafnium, or zirconium/hafnium based dinuclear metallocene compound; alternatively, an unbridged zirconium or hafnium based metallocene compound containing two cyclopentadienyl groups, two indenyl groups, or a cyclopentadienyl and an indenyl group; alternatively, an unbridged zirconium based metallocene compound containing two cyclopentadienyl groups, two indenyl groups, or a cyclopentadienyl and an indenyl group. Illustrative and non-limiting examples of unbridged metallocene compounds (e.g., with zirconium or hafnium) that can be employed in catalyst systems consistent with embodiments of the present invention are described in U.S.

Pat. Nos. 7,199,073, 7,226,886, 7,312,283, and 7,619,047, the disclosures of which are incorporated herein by reference in their entirety.

In another embodiment, the first metallocene catalyst component can produce the lower molecular weight component of the olefin polymer, and the first metallocene catalyst component can comprise zirconium, or alternatively, hafnium. Representative and non-limiting examples of metallocene compounds that can be employed as the first metallocene compound can include, but are not limited to, the following (Ph=phenyl):

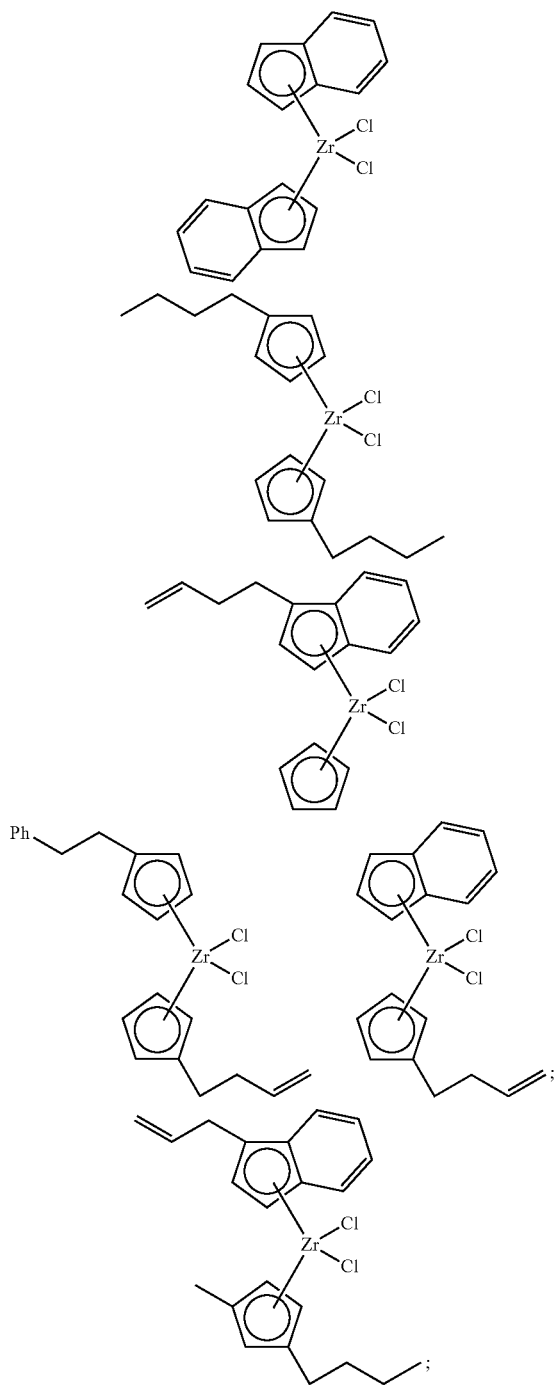

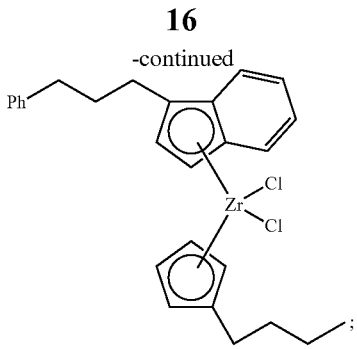

and the like, as well as combinations thereof.

Moreover, the first metallocene catalyst component can comprise an unbridged dinuclear metallocene such as those described in U.S. Pat. Nos. 7,919,639 and 8,080,681, the disclosures of which are incorporated herein by reference in their entirety. The first metallocene catalyst component can comprise an unbridged zirconium, hafnium, or zirconium/hafnium based dinuclear metallocene compound. For example, the first metallocene catalyst component can comprise an unbridged zirconium based homodinuclear metallocene compound, or an unbridged hafnium based homodinuclear metallocene compound, or an unbridged zirconium, hafnium, or zirconium/hafnium based heterodinuclear metallocene compound (i.e., a dinuclear compound with two hafniums, or two zirconiums, or one zirconium and one hafnium). Representative and non-limiting dinuclear compounds can include the following:
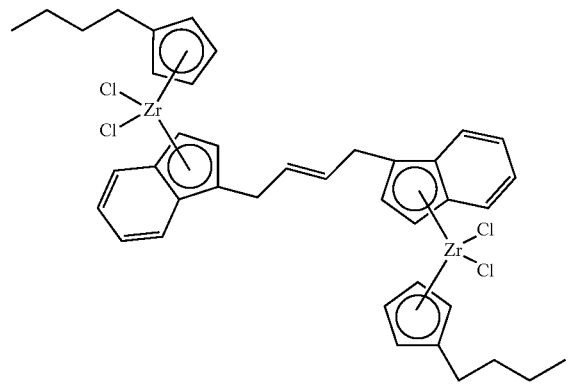
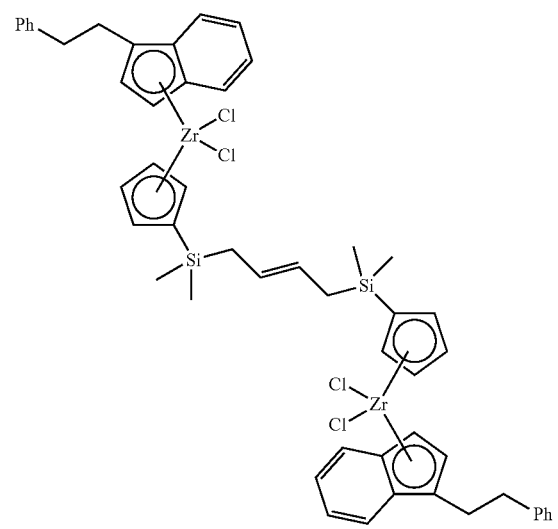
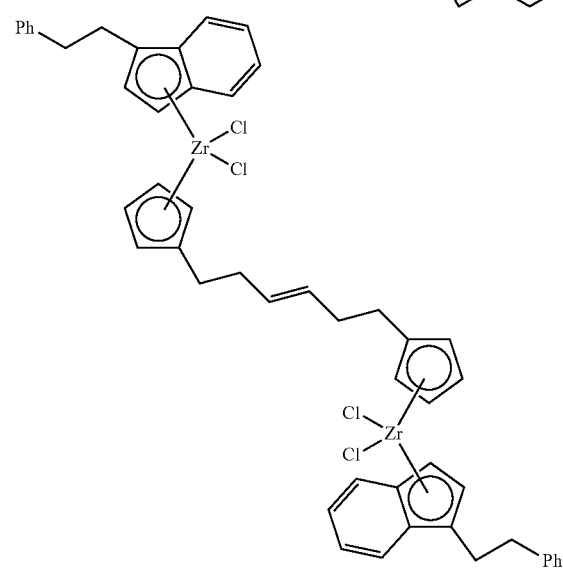
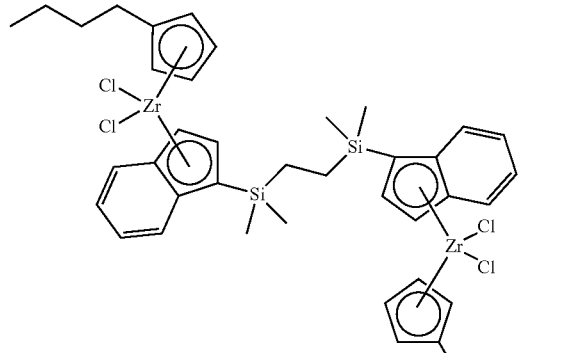
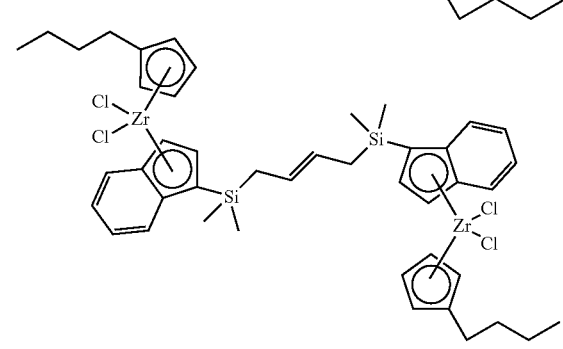
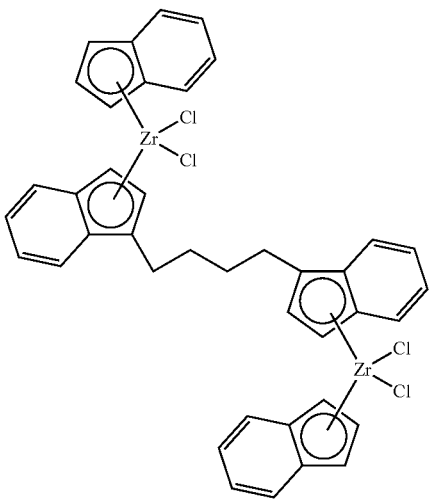

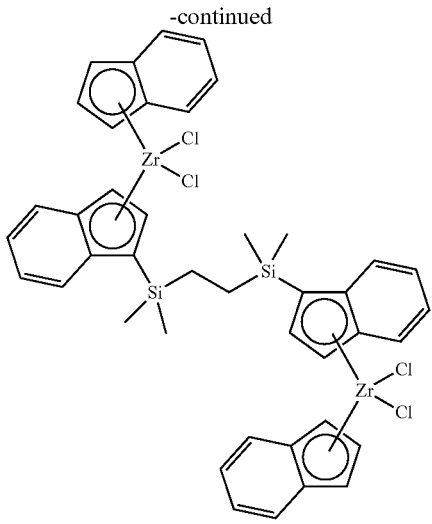

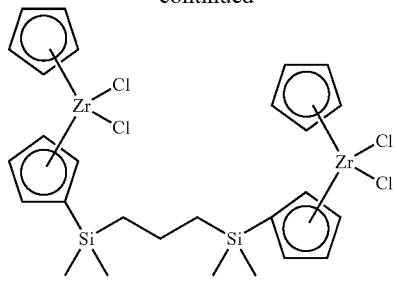

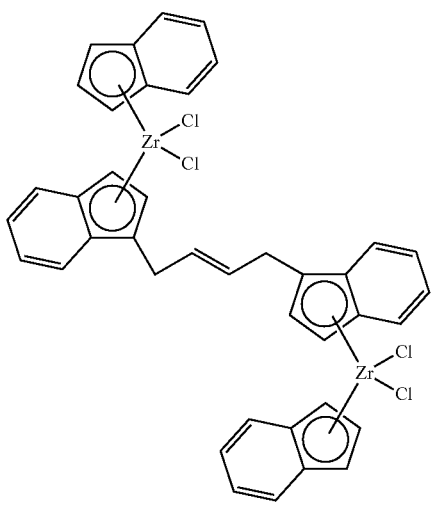

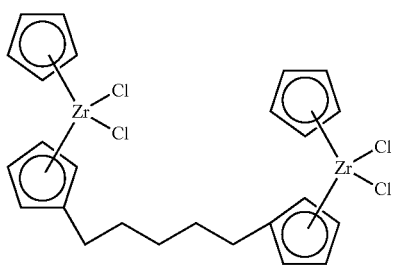

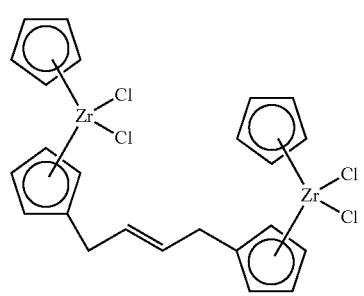

and the like, as well as combinations thereof.

While not being limited thereto, the second metallocene catalyst component can comprise a bridged metallocene compound, e.g., with titanium, zirconium, or hafnium, such as a bridged zirconium based metallocene compound with a fluorenyl group, and with no aryl groups on the bridging group, or a bridged zirconium based metallocene compound with a cyclopentadienyl group and a fluorenyl group, and with no aryl groups on the bridging group. Such bridged metallocenes, in some embodiments, can contain an alkenyl substituent (e.g., a terminal alkenyl) on the bridging group, on a cyclopentadienyl-type group (e.g., a cyclopentadienyl group, a fluorenyl group, etc.), or on the bridging group and the cyclopentadienyl group. In another embodiment, the second metallocene catalyst component can comprise a bridged zirconium or hafnium based metallocene compound with a fluorenyl group, and an aryl group on the bridging group; alternatively, a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other embodiments, the aryl group on the bridging group can be a phenyl group. Optionally, these bridged metallocenes can contain an alkenyl substituent (e.g., a terminal alkenyl) on the bridging group, on a cyclopentadienyl-type group, or on both the bridging group and the cyclopentadienyl group. Illustrative and non-limiting examples of bridged metallocene compounds (e.g., with zirconium or hafnium) that can be employed in catalyst systems consistent with embodiments of the present invention are described in U.S. Pat. Nos. 7,026,494, 7,041,617, 7,226,886, 7,312,283, 7,517,939, and 7,619,047, the disclosures of which are incorporated herein by reference in their entirety.

In another embodiment, the second metallocene catalyst component can produce the higher molecular weight component of the olefin polymer, and the second metallocene catalyst component can comprise zirconium, hafnium, or both. Representative and non-limiting examples of metallocene compounds that can be employed as the second metallocene compound can include, but are not limited to, the following (Ph=phenyl, Me=methyl, and t-Bu=tert-butyl):
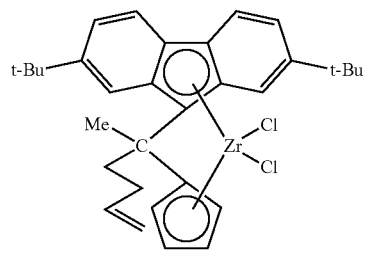
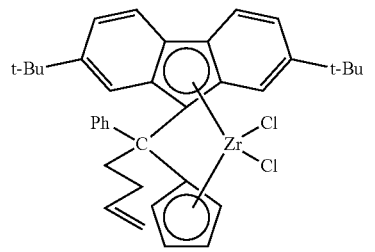
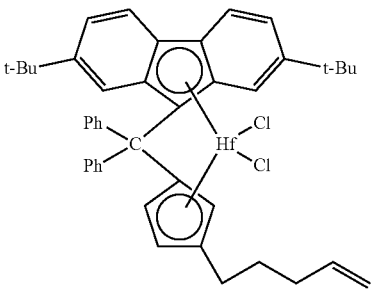
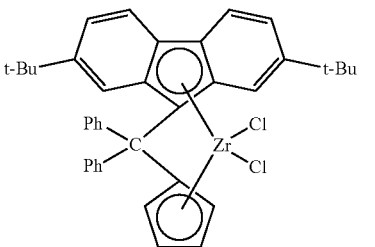
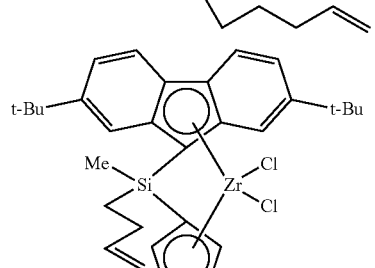
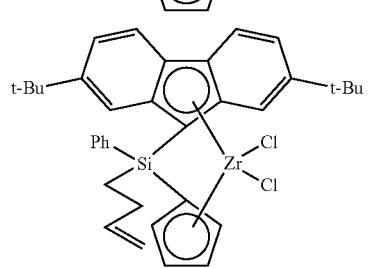
-continued
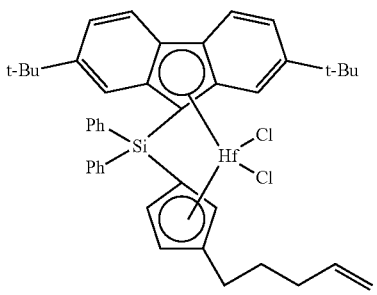
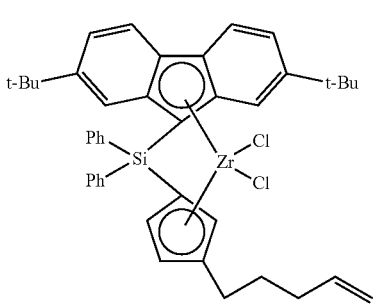
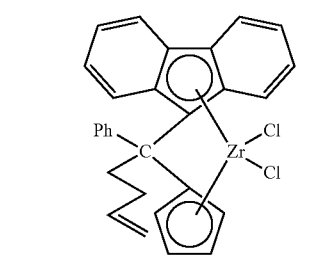
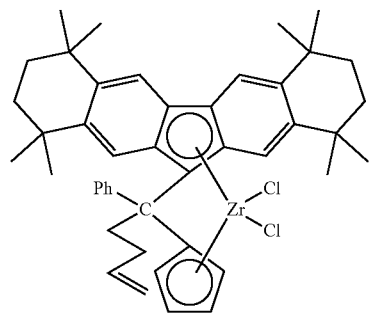
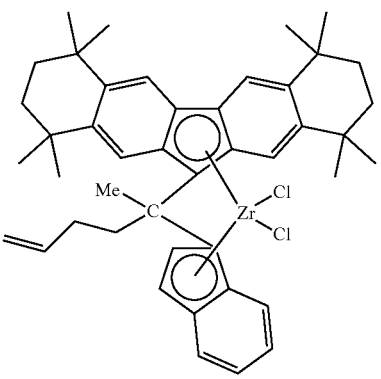

-continued

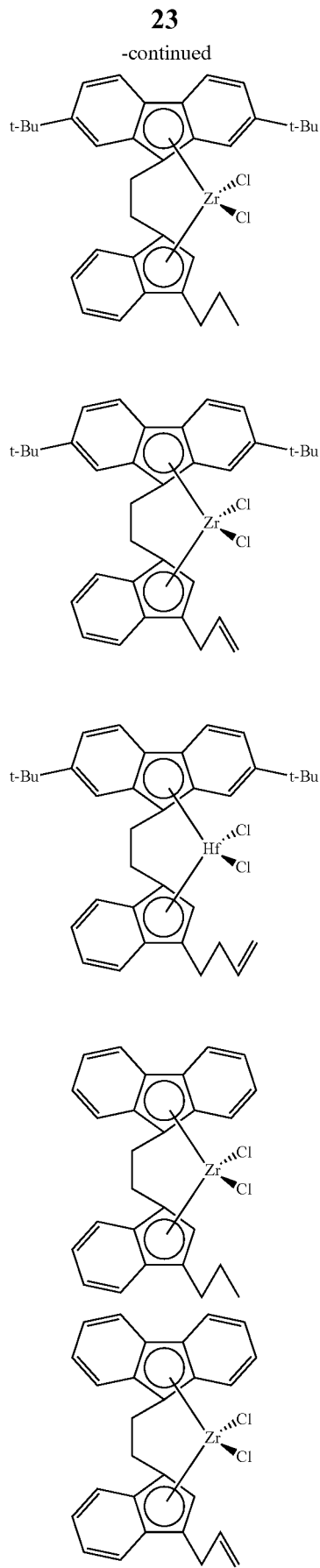

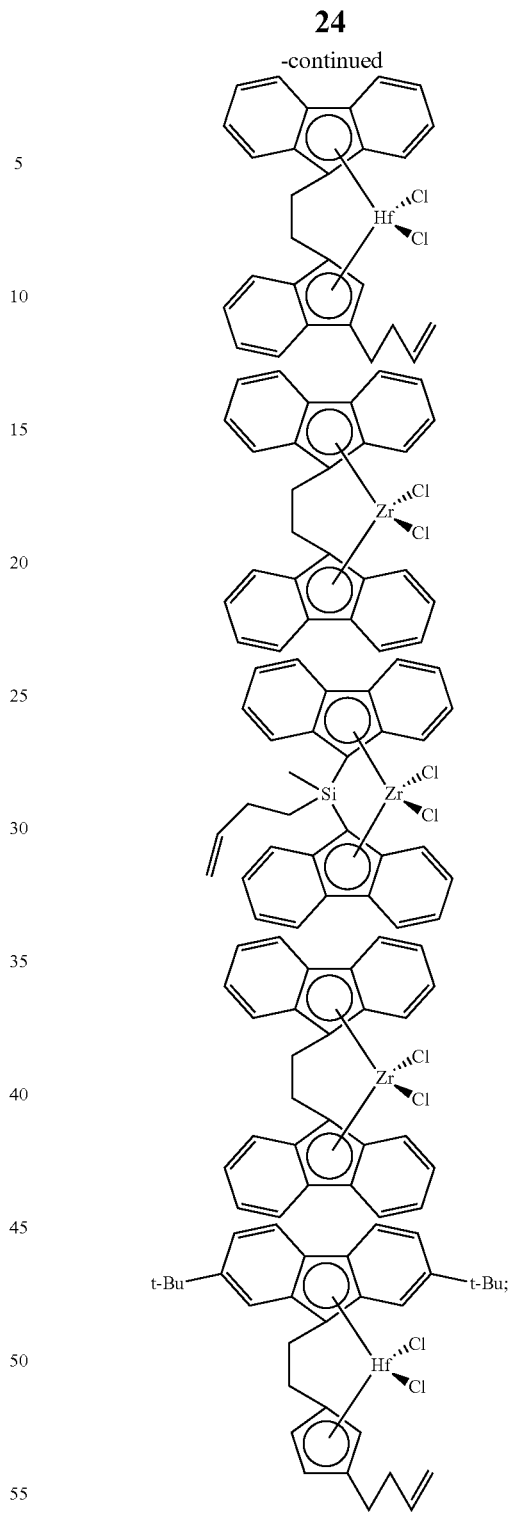

and the like, as well as combinations thereof.

In some embodiments, the dual catalyst system can comprise an activator. For example, the dual catalyst system can comprise a first metallocene catalyst component, a second metallocene catalyst component, and an activator, such as an activator-support, an aluminoxane compound, an organoboron or organoborate compound, an ionizing ionic compound, and the like, or any combination thereof. The catalyst system can contain one or more than one activator.

In one embodiment, the dual catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. In another embodiment, the dual catalyst system can comprise an aluminoxane compound. In yet another embodiment, the dual catalyst system can comprise an organoboron or organoborate compound. In still another embodiment, the dual catalyst system can comprise an ionizing ionic compound.

In other embodiments, the dual catalyst system can comprise an activator-support, for example, an activator-support comprising a solid oxide treated with an electron-withdrawing anion. Examples of such materials are disclosed in, for instance, U.S. Pat. Nos. 7,294,599 and 7,601,665, the disclosures of which are incorporated herein by reference in their entirety.

The solid oxide used to produce the activator-support can comprise oxygen and one or more elements from Groups 2, 3, 4, 5, 6, 7, 8, 9, 10, 11, 12, 13, 14, or 15 of the periodic table, or comprising oxygen and one or more elements from the lanthanide or actinide elements (see e.g., Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For instance, the solid oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Accordingly, suitable examples of solid oxide materials that can be used to form the activator-supports can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. This includes co-gels or co-precipitates of different solid oxide materials. The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163, the disclosure of which is incorporated herein by reference in its entirety.

Accordingly, in one embodiment, the solid oxide can comprise silica, alumina, silica-alumina, silica-coated alumina, aluminum phosphate, aluminophosphate, heteropolytungstate, titania, zirconia, magnesia, boria, zinc oxide, any mixed oxide thereof, or any combination thereof. In another embodiment, the solid oxide can comprise silica, alumina, titania, zirconia, magnesia, boria, zinc oxide, any mixed oxide thereof, or any combination thereof In yet another embodiment, the solid oxide can comprise silica-alumina, silica-coated alumina, silica-titania, silica-zirconia, alumina-boria, or any combination thereof. In still another embodiment, the solid oxide can comprise silica; alternatively, alumina; alternatively, silica-alumina; or alternatively, silica-coated alumina.

The silica-alumina which can be used typically can have an alumina content from about 5 to about 95% by weight. In one embodiment, the alumina content of the silica-alumina can be from about 5 to about 50%, or from about 8% to about 30%, alumina by weight. In another embodiment, high alumina content silica-alumina materials can be employed, in which the alumina content of these silica-alumina materials typically can range from about 60% to about 90%, or from about 65% to about 80%, alumina by weight. According to yet another embodiment, the solid oxide component can comprise alumina without silica, and according to another embodiment, the solid oxide component can comprise silica without alumina. Moreover, as provided hereinabove, the solid oxide can comprise a silica-coated alumina. The solid oxide can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one embodiment, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some embodiments provided herein. In other embodiments, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof.

In an embodiment, the dual catalyst system can comprise an activator-support, and the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, as well as any mixture or combination thereof. In another embodiment, the dual catalyst system can comprise an activator-support, and the activator-support can comprise a fluorided solid oxide, a sulfated solid oxide, or a combination thereof. In yet another embodiment, the dual catalyst system can comprise an activator-support, and the activator-support can comprise fluorided alumina, sulfated alumina, fluorided silica-alumina, sulfated silica-alumina, fluorided silica-zirconia, fluorided silica-coated alumina, sulfated silica-coated alumina, and the like, as well as any mixture or combination thereof.

As described herein, the alcohol compound can be added to the polymerization reactor system (e.g., into a polymerization reactor) alone, with a carrier, with the dual catalyst system, etc., and the amount of the alcohol compound added to the reactor system is not particularly limited, so long as the amount of the alcohol compound added to the reactor system is sufficient to impact at least one of the MI, HLMI, Mw, and Mz of the olefin polymer as described herein, and does not adversely impact the catalyst activity or polymer production rate in a significant manner (e.g., 20%+reduction in catalyst activity, polymer production rate, or both). Nonetheless, while not being limited thereto, the amount of the alcohol compound added typically can be in a range of the moles of hydroxyl (—OH) groups of the alcohol compound to the weight (in grams) of the activator (e.g., an activator-support comprising a solid oxide treated with an electron-withdrawing anion) of from about 1:10,000 to about 1:10. This range of ratios is based on the respective amounts of hydroxyl groups of the alcohol compound and the weight of activator (e.g., activator-support) fed into the reactor system (e.g., into a polymerization reactor). As a non-limiting example of a 1:1000 ratio, in a continuous polymerization reactor system, the total amount of an activator, such as an activator-support, fed into the reactor(s) per time interval can be "W" g/hour; thus, the amount of the alcohol compound fed into the reactor(s) would be equal to "0.001 W" moles/hour (moles of hydroxyl groups) for a 1:1000 ratio.

In some embodiments, this ratio (moles of hydroxyl groups of the alcohol compound to weight of the activator, such as an activator-support) can be in a range from about 1:10,000 to about 1:10, from about 1:5,000 to about 1:10, from about 1:2,500 to about 1:10, from about 1:10,000 to about 1:50, from about 1:5,000 to about 1:50, from about 1:5,000 to about 1:100, from about 1:5,000 to about 1:250, or from about 1:5,000 to about 1:500. In particular embodiments considered herein, the ratio can be in a range from about 1:7,000 to about 1:100, from about to about 1:2,500 to about 1:250, from about 1:1,500 to about 1:250, from about 1:1,500 to about 1:500, from about 1:2,000 to about 1:1,000, or from about 1:1,500 to about 1:1,000.

Commonly used polymerization co-catalysts which can be utilized in the dual catalyst system can include, but are not limited to, metal alkyl, or organometal, co-catalysts, with the metal being, for example, aluminum. The dual catalyst systems provided herein can comprise a co-catalyst, or a combination of co-catalysts. While not being limited thereto, representative aluminum compounds (e.g., organoaluminum compounds) can include trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof. Thus, a dual catalyst system provided herein can comprise a first metallocene catalyst component, a second metallocene catalyst component, an activator, and a co-catalyst. In an embodiment, the co-catalyst can comprise an organoaluminum compound, such as triethylaluminum or triisobutylaluminum, while the activator can comprise a fluorided solid oxide or a sulfated solid oxide, representative examples of which can include fluorided alumina, sulfated alumina, fluorided silica-alumina, sulfated silica-alumina, fluorided silica-zirconia, fluorided silica-coated alumina, sulfated silica-coated alumina, as well as any combination thereof.

The amount of the alcohol compound added to the reactor system, based on the amount of the co-catalyst, is not particularly limited, so long as the amount of the alcohol compound added to the reactor system is sufficient to impact at least one of the MI, HLMI, Mw, and Mz of the olefin polymer as described herein, and does not adversely impact the catalyst activity or polymer production rate in a significant manner (e.g., 20%+reduction in catalyst activity, polymer production rate, or both). As one of skill in the art would readily understand, an excess of the alcohol compound, as compared to the co-catalyst component of the dual catalyst system, can drastically reduce the catalyst activity and polymer production rate and, eventually, can "kill" the reaction. Accordingly, while not being limited thereto, the amount of the alcohol compound added typically can be in a range of moles of hydroxyl (—OH) groups of the alcohol compound to the moles of the co-catalyst (e.g., an organoaluminum compound) from about 0.05:1 to about 0.9:1. This molar ratio is based on the respective amounts of hydroxyl groups of the alcohol compound and the co-catalyst fed into the reactor system (e.g., into a polymerization reactor). As a non-limiting example of a 0.5:1 molar ratio, in a continuous polymerization reactor system, the amount of the co-catalyst component (e.g., an organoaluminum compound) fed into the reactor(s) per time interval can be "Z" moles/hour; thus, the amount of the alcohol compound fed into the reactor(s) would be equal to "0.5Z" moles/hour (moles of hydroxyl groups) for a 0.5:1 molar ratio.

In some embodiments, the molar ratio (moles of hydroxyl groups of the alcohol compound to moles of co-catalyst, such as organoaluminum compounds) can be in a range from about 0.05:1 to about 0.85:1, from about 0.1:1 to about 0.9:1, from about 0.1:1 to about 0.85:1, from about 0.05:1 to about 0.8:1, from about 0.1:1 to about 0.8:1, from about 0.05:1 to about 0.75:1, from about 0.1:1 to about 0.75:1, from about 0.15:1 to about 0.85:1, or from about 0.15:1 to about 0.75:1. In particular embodiments considered herein, the molar ratio can be in a range from about 0.2:1 to about 0.9:1, from about to about 0.2:1 to about 0.8:1, from about 0.2:1 to about 0.7:1, from about 0.2:1 to about 0.6:1, from about 0.1:1 to about 0.6:1, or from about 0.25:1 to about 0.75:1.

Olefin Monomers and Olefin Polymers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization, terpolymerization, etc., reactions using an olefin monomer with at least one different olefinic compound. For example, resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (α), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an embodiment, the olefin monomer can comprise a $C_2$-$C_{20}$ olefin; alternatively, a $C_2$-$C_{20}$ α-olefin; alternatively, a $C_2$-$C_{12}$ olefin; alternatively, a $C_2$-$C_{10}$ α-olefin; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can be, for example, ethylene or propylene, which is copolymerized with at least one comonomer (e.g., a $C_2$-$C_{20}$ α-olefin, a $C_3$-$C_{20}$ α-olefin, etc.). According to one embodiment, the olefin monomer in the polymerization process can be ethylene. In this embodiment, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another embodiment, the comonomer can comprise an α-olefin (e.g., a $C_3$-$C_{10}$ α-olefin), while in yet another embodiment, the comonomer can comprise 1-butene, 1-pentene, 1-hexene, 1-octene, 1-decene, styrene, or any combination thereof. For example, the comonomer can comprise 1-butene, 1-hexene, 1-octene, or a combination thereof.

Generally, the amount of comonomer introduced into a polymerization reactor to produce the copolymer can be from about 0.01 to about 50 weight percent of the comonomer based on the total weight of the monomer and comonomer. According to another embodiment, the amount of comonomer introduced into a polymerization reactor can be from about 0.01 to about 40 weight percent comonomer based on the total weight of the monomer and comonomer. In still another embodiment, the amount of comonomer introduced into a polymerization reactor can be from about 0.1 to about 35 weight percent comonomer based on the total weight of the monomer and comonomer. Yet, in another embodiment, the amount of comonomer introduced into a polymerization reactor can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede or slow the polymerization reaction. Thus, branched or cyclic portion(s) of the olefin removed somewhat from the carbon-carbon double bond would not be expected to hinder the reaction in the way that the same olefin substituents situated more proximate to the carbon-carbon double bond might.

According to one embodiment, at least one monomer/reactant can be ethylene, so the polymerization reaction can be a homopolymerization involving only ethylene, or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer (or oligomer) produced from any olefin monomer (and optional comonomer(s)) described herein. For example, the olefin polymer can comprise an ethylene homopolymer, a propylene homopolymer, an ethylene copolymer (e.g., ethylene/α-olefin, ethylene/1-butene, ethylene/1-hexene, ethylene/1-octene, etc.), a propylene copolymer, an ethylene terpolymer, a propylene terpolymer, and the like, including combinations thereof. Moreover, additional polymer components can be present in the olefin polymer, in addition to the higher molecular weight component and the lower molecular weight component. Accordingly, in one embodiment, the olefin polymer can have a bimodal molecular weight distribution, while in another embodiment, the olefin polymer can have a multimodal molecular weight distribution. In yet another embodiment, the olefin polymer can have a unimodal molecular weight distribution.

Polymerization Reactor Systems

The disclosed methods and processes are intended for any olefin polymerization process using various types of polymerization reactors, polymerization reactor systems, and polymerization reaction conditions. As used herein, "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop or gas phase reactors. The multiple reactors can be operated in series, in parallel, or both.

According to one embodiment, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer, comonomer, etc. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another embodiment, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, catalyst components, etc., can be entrained in a gaseous stream and introduced at another zone of the reactor. The gas streams can be intermixed for polymerization. Heat and pressure can be employed appropriately to obtain optimal polymerization reaction conditions.

According to yet another embodiment, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.), and as discussed hereinabove.

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor. In some reactor systems, the polymerization temperature generally can be within a range from about 70° C. to about 110° C., or from about 75° C. to about 95° C. Suitable pressures will also vary according to the reactor and polymerization type.

The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at about 20,000 to 75,000 psig. Polymerization reactors also can be operated in a supercritical region occurring at generally higher temperatures and pressures. Operation above the critical point of a pressure/temperature diagram (supercritical phase) can offer advantages.

EXAMPLES

Embodiments of the invention are further illustrated by the following examples, which are not to be construed in any way as imposing limitations to the scope of this invention described herein. Various other aspects, embodiments, modifications, and equivalents thereof which, after reading the description herein, can suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight. High load melt index (HLMI, g/10 min) was determined in accordance with ASTM D1238 at 190° C. with a 21,600 gram weight.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. The integral calibration method was used to deduce molecular weights and molecular weight distributions using a Chevron Phillips Chemicals Company's HDPE polyethylene resin, MARLEX BHB5003, as the broad standard. The integral table of the broad standard was pre-determined in a separate experiment with SEC-MALS. $M_n$ is the number-average molecular weight, $M_w$ is the weight-average molecular weight, $M_z$ is the z-average molecular weight, and $M_p$ is the peak molecular weight.

Sulfated alumina activator-supports were prepared as follows. Bohemite was obtained from W.R. Grace & Company under the designation "Alumina A" and having a surface area of about 300 m²/g and a pore volume of about 1.3 mL/g. This material was obtained as a powder having an average particle size of about 100 microns. This material was impregnated to incipient wetness with an aqueous solution of ammonium sulfate to equal about 15% sulfate. This mixture was then placed in a flat pan and allowed to dry under vacuum at approximately 110° C. for about 16 hours. To calcine the resultant powdered mixture, the material was fluidized in a stream of dry air at about 550° C. for about 6 hours. Afterward, the sulfated alumina was collected and stored under dry nitrogen, and was used without exposure to the atmosphere.

Examples 1-4

Impact of the Addition of Isopropyl Alcohol on the Melt Index and Molecular Weight Parameters of an Ethylene/1-Hexene Copolymer The polymerization experiments of Examples 1-4 were conducted in a one-gallon (3.8-L) stainless steel reactor with 2 L of isobutane. Metallocene solutions (nominal 1 mg/mL) of MET-A and MET-B were prepared by dissolving 15 mg of the respective metallocene in 15 mL of toluene. Metallocene compounds MET-A and MET-B had the following structures:

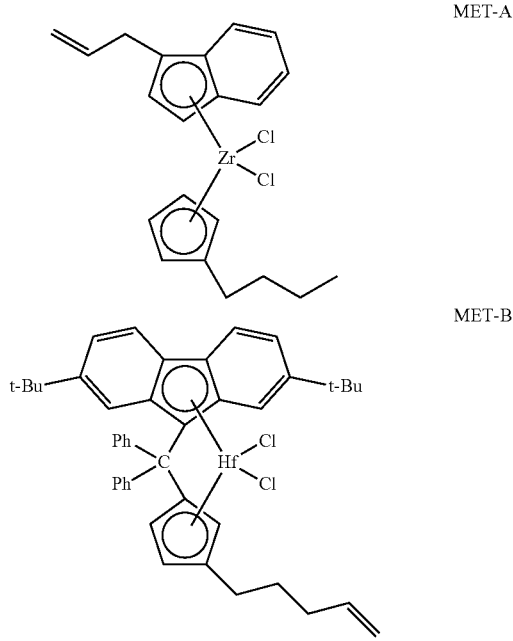

Approximately 2 mg of MET-A and 2 mg of MET-B (a 1:1 weight ratio) were used in Examples 1-4, and the MET-A and MET-B metallocene solutions were premixed before they were charged into the reactor.

The polymerization experiments were performed as follows. First, 0.6 mmol of triisobutylaluminum (TIBA), 300 mg of sulfated alumina, and the premixed metallocene solution containing MET-A and MET-B were added in that order through a charge port while slowly venting isobutane vapor. The charge port was closed and 2 L of isobutane were added. The contents of the reactor were stirred and heated to the desired polymerization reaction temperature of 95° C., and ethylene and isopropyl alcohol were then introduced into the reactor with 10 g of 1-hexene and hydrogen ($H_2$) at 300 ppm by weight of the ethylene. Ethylene and hydrogen were fed on demand at the specified weight ratio to maintain the target pressure of 420 psig pressure for the 45 minute length of each polymerization experiment. The reactor was maintained at the desired reaction temperature throughout the experiment by an automated heating-cooling system.

Table I summarizes the amount of isopropyl alcohol added, the amount of polymer produced, and the melt flow and molecular weight parameters for the polymers of Examples 1-4. As shown in Table I, and unexpectedly, the addition of isopropyl alcohol decreased the MI and the HLMI, and increased the Mw and Mz of the polymer. Moreover, the addition of isopropyl alcohol decreased the Mz/Mw ratio of the polymer. Furthermore, and quite surprisingly, the addition of isopropyl alcohol did not significantly impact the amount of polymer produced (or the catalyst activity).

The impact of isopropyl alcohol addition on the molecular weight distributions (amount of polymer versus logarithm of molecular weight) of the polymers of Examples 1-4 is illustrated graphically in the FIGURE. As shown in the FIGURE, and unexpectedly, the addition of isopropyl alcohol increased the weight ratio of the higher molecular weight (HMW) component to the lower molecular weight (LMW) component; relatively more higher molecular weight material was produced. Moreover, the peak molecular weight of the lower molecular weight component and the peak molecular weight of the higher molecular weight component were not substantially affected by isopropyl alcohol addition.

TABLE I

| Summary of Examples 1-4. | | | | |
|---|---|---|---|---|
| Example | 1 | 2 | 3 | 4 |
| Isopropyl alcohol (mmol) | 0 | 0.2 | 0.33 | 0.46 |
| PE Produced (g) | 207 | 238 | 231 | 203 |
| MI (g/10 min) | 0.07 | 0 | 0 | 0 |
| HLMI (g/10 min) | 16.6 | 6.5 | 3.4 | 1.5 |
| HLMI/MI | 236 | — | — | — |
| Mn/1000 (g/mol) | 11.7 | 12.4 | 11.8 | 19.0 |
| Mw/1000 (g/mol) | 249 | 288 | 316 | 363 |
| Mz/1000 (g/mol) | 1,135 | 1,346 | 1,369 | 1,439 |
| Mp/1000 (g/mol) | 20.5 | 19.5 | 474 | 452 |
| Mw/Mn | 21.3 | 23.2 | 26.8 | 19.2 |
| Mz/Mw | 4.6 | 4.7 | 4.3 | 4.0 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

A method of controlling a polymerization reaction in a polymerization reactor system, the method comprising:

(i) contacting a dual catalyst system with an olefin monomer and an optional olefin comonomer in the polymerization reactor system under polymerization conditions to produce an olefin polymer;

wherein the dual catalyst system comprises a first metallocene catalyst component, a second metallocene catalyst component, an activator, and a co-catalyst; and (ii) introducing an amount of an alcohol compound into the polymerization reactor system to reduce a melt index parameter (e.g., MI, HLMI, etc.), to increase a molecular weight parameter (e.g., Mw, Mz, etc.), or to reduce a melt index parameter and increase a molecular weight parameter, of the olefin polymer.

Embodiment 2

A process for producing an olefin polymer with a target melt index parameter (e.g., MI, HLMI, etc.), a target molecular weight parameter (e.g., Mw, Mz, etc.), or a target melt index parameter and a target molecular weight parameter, the process comprising:

(a) contacting a dual catalyst system with an olefin monomer and an optional olefin comonomer in a polymerization reactor system under polymerization conditions, wherein the dual catalyst system comprises a first metallocene catalyst component, a second metallocene catalyst component, an activator, and a co-catalyst; and (b) controlling an amount of an alcohol compound introduced into the polymerization reactor system to produce the olefin polymer with the target melt index parameter (e.g., MI, HLMI, etc.), the target molecular weight parameter (e.g., Mw, Mz, etc.), or the target melt index parameter and the target molecular weight parameter.

Embodiment 3

The method or process defined in embodiment 1 or 2, wherein the alcohol compound comprises any alcohol compound disclosed herein, e.g., a mono-ol, a diol, a triol, a polyol, etc., as well as combinations thereof.

Embodiment 4

The method or process defined in any one of embodiments 1-3, wherein the alcohol compound comprises a hydrocarbyl alcohol, e.g., an alkyl alcohol, a cycloalkyl alcohol, an aryl alcohol, an arylalkyl alcohol, etc., as well as combinations thereof.

Embodiment 5

The method or process defined in any one of embodiments 1-4, wherein the alcohol compound comprises a $C_1$ to $C_{32}$ alcohol, e.g., a $C_1$ to $C_{18}$ alcohol, a $C_1$ to $C_8$ alcohol, a $C_1$ to $C_4$ alcohol, etc.

Embodiment 6

The method or process defined in any one of embodiments 1-3, wherein the alcohol compound comprises any mono-ol disclosed herein, e.g., methanol, ethanol, propanol (e.g., isopropanol, n-propanol), butanol (e.g., n-butanol, isobutanol), pentanol, hexanol, heptanol, octanol, decanol, hexadecanol, cyclohexanol, phenol, benzyl alcohol, etc., as well as combinations thereof.

Embodiment 7

The method or process defined in any one of embodiments 1-3, wherein the alcohol compound comprises any diol disclosed herein, e.g., methanediol, ethylene glycol, propylene glycol, butanediol (e.g., 1,4-butanediol), pentanediol, octanediol, bisphenol A, etc., as well as combinations thereof.

Embodiment 8

The method or process defined in any one of embodiments 1-3, wherein the alcohol compound comprises any triol disclosed herein, e.g., glycerol, benzenetriol, etc., as well as combinations thereof.

Embodiment 9

The method or process defined in any one of embodiments 1-3, wherein the alcohol compound comprises any polyol disclosed herein, e.g., erythritol, xylitol, mannitol, etc., as well as combinations thereof.

Embodiment 10

The method or process defined in any one of embodiments 1-9, wherein the alcohol compound has a boiling point in any range disclosed herein, e.g., at least 60° C., at least 100° C., in range from 60° C. to 400° C., in a range from 100° C. to 350° C., etc.

Embodiment 11

The method or process defined in any one of embodiments 1-10, wherein the alcohol compound is a liquid at a temperature in any range disclosed herein, e.g., from 50° C. to 200° C., from 50° C. to 150° C., from 75° C. to 250° C., from 75° C. to 175° C., etc.

Embodiment 12

The method or process defined in any one of embodiments 1-12, wherein the alcohol compound is miscible with or soluble in any $C_3$ to $C_{10}$ hydrocarbon solvent disclosed herein, e.g., propane, cyclohexane, isobutane, n-butane, n-pentane, isopentane, neopentane, n-hexane, benzene, etc., as well as mixtures thereof.

Embodiment 13

The method or process defined in any one of embodiments 1-12, wherein the catalyst system comprises any (one or more) first metallocene catalyst component, any (one or more) second metallocene catalyst component, any (one or more) activator, and any (one or more) co-catalyst disclosed herein.

Embodiment 14

The method or process defined in any one of embodiments 1-13, wherein the activator comprises an aluminoxane compound.

Embodiment 15

The method or process defined in any one of embodiments 1-13, wherein the activator comprises an organoboron or organoborate compound.

Embodiment 16

The method or process defined in any one of embodiments 1-13, wherein the activator comprises an ionizing ionic compound.

Embodiment 17

The method or process defined in any one of embodiments 1-13, wherein the activator comprises an activator-support

37 comprising a solid oxide treated with an electron-withdrawing anion, for example, an activator-support comprising any solid oxide treated with any electron-withdrawing anion disclosed herein.

Embodiment 18

The method or process defined in embodiment 17, wherein the activator-support comprises a fluorided solid oxide, a sulfated solid oxide, or a combination thereof.

Embodiment 19

The method or process defined in embodiment 17, wherein the solid oxide comprises silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof; and the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or any combination thereof.

Embodiment 20

The method or process defined in embodiment 17, wherein the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Embodiment 21

The method or process defined in embodiment 17, wherein the activator-support comprises fluorided alumina, sulfated alumina, fluorided silica-alumina, sulfated silica-alumina, fluorided silica-zirconia, fluorided silica-coated alumina, sulfated silica-coated alumina, or any combination thereof.

Embodiment 22

The method or process defined in any one of embodiments 1-21, wherein the amount of the alcohol compound introduced into the polymerization reactor system is in any range of molar ratios disclosed herein, based on the moles of hydroxyl (—OH) groups of the alcohol compound to the total moles of the first metallocene catalyst component and the second metallocene catalyst component, e.g., from about 10:1 to about 1000:1, from about 20:1 to about 500:1, from about 25:1 to about 100:1, etc.

Embodiment 23

The method or process defined in any one of embodiments 1-22, wherein the amount of the alcohol compound introduced into the polymerization reactor system is in any range of ratios disclosed herein, based on the moles of hydroxyl (—OH) groups of the alcohol compound to the weight of the activator in grams, e.g., from about 1:10,000 to about 1:10, from about 1:5,000 to about 1:100, from about 1:1,500 to about 1:500, etc.

38

Embodiment 24

The method or process defined in any one of embodiments 1-23, wherein the co-catalyst comprises any organoaluminum compound disclosed herein.

Embodiment 25

The method or process defined in embodiment 24, wherein the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 26

The method or process defined in embodiment 24 or 25, wherein the organoaluminum compound comprises triethylaluminum.

Embodiment 27

The method or process defined in embodiment 24 or 25, wherein the organoaluminum compound comprises triisobutylaluminum.

Embodiment 28

The method or process defined in any one of embodiments 24-27, wherein the activator comprises a fluorided solid oxide, a sulfated solid oxide, or a combination thereof.

Embodiment 29

The method or process defined in any one of embodiments 24-28, wherein the activator comprises fluorided alumina, sulfated alumina, fluorided silica-alumina, sulfated silica-alumina, fluorided silica-zirconia, fluorided silica-coated alumina, sulfated silica-coated alumina, or any combination thereof.

Embodiment 30

The method or process defined in any one of embodiments 1-29, wherein the amount of the alcohol compound introduced into the polymerization reactor system is in any range of molar ratios disclosed herein, based on the moles of hydroxyl (—OH) groups of the alcohol compound to the moles of the co-catalyst, e.g., from about 0.05:1 to about 0.9:1, from about 0.1:1 to about 0.8:1, from about 0.2:1 to about 0.7:1, etc.

Embodiment 31

The method or process defined in any one of embodiments 1-30, wherein the polymerization reactor system comprises a batch reactor, a slurry reactor, a gas-phase reactor, a solution reactor, a high pressure reactor, a tubular reactor, an autoclave reactor, or a combination thereof.

Embodiment 32

The method or process defined in any one of embodiments 1-31, wherein the polymerization reactor system comprises a slurry reactor, a gas-phase reactor, a solution reactor, or a combination thereof.

Embodiment 33

The method or process defined in any one of embodiments 1-32, wherein the polymerization reactor system comprises a loop slurry reactor.

Embodiment 34

The method or process defined in any one of embodiments 1-33, wherein the polymerization reactor system comprises a single reactor.

Embodiment 35

The method or process defined in any one of embodiments 1-33, wherein the polymerization reactor system comprises 2 reactors.

Embodiment 36

The method or process defined in any one of embodiments 1-33, wherein the polymerization reactor system comprises more than 2 reactors.

Embodiment 37

The method or process defined in any one of embodiments 1-36, wherein the olefin monomer comprises a $C_2$-$C_{20}$ olefin.

Embodiment 38

The method or process defined in any one of embodiments 1-37, wherein the olefin monomer and the optional olefin comonomer independently comprise a $C_2$-$C_{20}$ alpha-olefin.

Embodiment 39

The method or process defined in any one of embodiments 1-38, wherein the olefin monomer comprises ethylene.

Embodiment 40

The method or process defined in any one of embodiments 1-39, wherein the catalyst system is contacted with ethylene and a $C_3$-$C_{10}$ alpha-olefin comonomer.

Embodiment 41

The method or process defined in any one of embodiments 1-40, wherein the catalyst system is contacted with ethylene and a comonomer selected from 1-butene, 1-hexene, 1-octene, or a mixture thereof.

Embodiment 42

The method or process defined in any one of embodiments 1-41, wherein the olefin polymer in step (ii) or step (b) (or both) has a multimodal molecular weight distribution.

Embodiment 43

The method or process defined in any one of embodiments 1-41, wherein the olefin polymer in step (ii) or step (b) (or both) has a bimodal molecular weight distribution.

Embodiment 44

The method or process defined in any one of embodiments 1-41, wherein the olefin polymer in step (ii) or step (b) (or both) has a unimodal molecular weight distribution.

Embodiment 45

The method or process defined in any one of embodiments 1-44, wherein the melt index (MI) of the olefin polymer in step (ii) or step (b) (or both) is in any range disclosed herein, e.g., from 0 to about 25 g/10 min, from 0 to about 1 g/10 min, from 0 to about 0.5 g/10 min, etc.

Embodiment 46

The method or process defined in any one of embodiments 1-45, wherein the high load melt index (HLMI) of the olefin polymer in step (ii) or step (b) (or both) is in any range disclosed herein, e.g., from 0 to about 100 g/10 min, from about 0.1 to about 50 g/10 min, from about 0.5 to about 25 g/10 min, etc.

Embodiment 47

The method or process defined in any one of embodiments 1-46, wherein the number-average molecular weight (Mn) of the olefin polymer in step (ii) or step (b) (or both) is in any range disclosed herein, e.g., from about 5,000 to about 40,000 g/mol, from about 6,000 to about 25,000 g/mol, from about 9,000 to about 22,000 g/mol, etc.

Embodiment 48

The method or process defined in any one of embodiments 1-47, wherein the weight-average molecular weight (Mw) of the olefin polymer in step (ii) or step (b) (or both) is in any range disclosed herein, e.g., from about 100,000 to about 600,000 g/mol, from about 200,000 to about 500,000 g/mol, or from about 225,000 to about 400,000 g/mol.

Embodiment 49

The method or process defined in any one of embodiments 1-48, wherein the z-average molecular weight (Mz) of the olefin polymer in step (ii) or step (b) (or both) is in any range disclosed herein, e.g., from about 700,000 to about 3,000,000 g/mol, from about 800,000 to about 2,500,000 g/mol, or from about 1,000,000 to about 2,000,000 g/mol.

Embodiment 50

The method or process defined in any one of embodiments 1-49, wherein the Mw/Mn ratio of the olefin polymer in step (ii) or step (b) (or both) is in any range disclosed herein, e.g., from about 10 to about 40, from about 12 to about 35, from about 15 to about 35, from about 15 to about 30, etc.

Embodiment 51

The method or process defined in any one of embodiments 1-50, wherein the Mz/Mw ratio of the olefin polymer in step (ii) or step (b) (or both) is in any range disclosed herein, e.g., from about 3 to about 7, from about 3.5 to about 7, from about 3.5 to about 6, from about 3.8 to about 5.5, etc.

Embodiment 52

The method or process defined in any one of embodiments 1-51, wherein the olefin polymer is an ethylene/1-butene copolymer, an ethylene/1-hexene copolymer, or an ethylene/1-octene copolymer.

Embodiment 53

The method or process defined in any one of embodiments 1-52, wherein the olefin polymer is an ethylene/1-hexene copolymer.

Embodiment 54

The method or process defined in any one of embodiments 1-53, wherein the first metallocene catalyst component and the second metallocene catalyst component independently comprise chromium, vanadium, titanium, zirconium, hafnium, or a combination thereof.

Embodiment 55

The method or process defined in any one of embodiments 1-54, wherein the first metallocene catalyst component and the second metallocene catalyst component independently comprise titanium, zirconium, hafnium, or a combination thereof.

Embodiment 56

The method or process defined in any one of embodiments 1-55, wherein the first metallocene catalyst component comprises any first metallocene catalyst component disclosed herein, e.g., an unbridged metallocene compound, an unbridged dinuclear metallocene compound, etc.

Embodiment 57

The method or process defined in any one of embodiments 1-56, wherein the first metallocene catalyst component comprises zirconium.

Embodiment 58

The method or process defined in any one of embodiments 1-57, wherein the second metallocene catalyst component comprises any second metallocene catalyst component disclosed herein, e.g., a bridged metallocene compound, etc.

Embodiment 59

The method or process defined in any one of embodiments 1-58, wherein the second metallocene catalyst component comprises zirconium, hafnium, or both.

Embodiment 60

The method or process defined in any one of embodiments 1-59, wherein a weight ratio of the first metallocene catalyst component to the second metallocene catalyst component is substantially constant, for example, for a particular polymer grade.

Embodiment 61

The method or process defined in any one of embodiments 1-59, further comprising a step of adjusting a weight ratio of the first metallocene catalyst component to the second metallocene catalyst component.

Embodiment 62

The method or process defined in any one of embodiments 1-61, wherein the polymerization conditions comprise a polymerization reaction temperature in a range from about 60° C. to about 120° C. and a reaction pressure in a range from about 200 to about 1000 psig (about 1.4 to about 6.9 MPa).

Embodiment 63

The method or process defined in any one of embodiments 1-62, wherein the polymerization conditions are substantially constant, for example, for a particular polymer grade.

Embodiment 64

The method or process defined in any one of embodiments 1-62, further comprising a step of adjusting at least one polymerization condition, e.g., temperature, pressure, residence time, etc.

Embodiment 65

The method or process defined in any one of embodiments 1-64, wherein no hydrogen is added to the polymerization reactor system.

Embodiment 66

The method or process defined in any one of embodiments 1-64, wherein hydrogen is added to the polymerization reactor system, and the hydrogen addition is substantially constant, for example, for a particular polymer grade.

Embodiment 67

The method or process defined in any one of embodiments 1-64, further comprising a step of adding hydrogen to the polymerization reactor system to adjust the Mw or Mz (or Mw and Mz) of the polymer.

Embodiment 68

The method or process defined in any one of embodiments 1-64, further comprising a step of adding hydrogen to the polymerization reactor system to adjust the MI or HLMI (or MI and HLMI) of the polymer.

Embodiment 69

The method or process defined in any one of embodiments 66-68, wherein the step of adding hydrogen decreases the Mw, decreases the Mz, increases the MI, or increases the HLMI of the polymer, as well as any combination thereof.

Embodiment 70

The method or process defined in any one of embodiments 1-69, further comprising the steps of determining (or measuring) the MI, and adjusting the amount of the alcohol compound introduced into the polymerization reactor system based on the difference between the measured MI and the target MI.

Embodiment 71

The method or process defined in any one of embodiments 1-70, further comprising the steps of determining (or measuring) the HLMI, and adjusting the amount of the alcohol compound introduced into the polymerization reactor system based on the difference between the measured HLMI and the target HLMI.

Embodiment 72

The method or process defined in any one of embodiments 1-71, further comprising the steps of determining (or measuring) the Mw, and adjusting the amount of the alcohol compound introduced into the polymerization reactor system based on the difference between the measured Mw and the target Mw.

Embodiment 73

The method or process defined in any one of embodiments 1-72, further comprising the steps of determining (or measuring) the Mz, and adjusting the amount of the alcohol compound introduced into the polymerization reactor system based on the difference between the measured Mz and the target Mz.

Embodiment 74

The method or process defined in any one of embodiments 1-73, wherein the olefin polymer comprises a higher molecular weight component and a lower molecular weight component.

Embodiment 75

The method or process defined in embodiment 74, wherein introducing the alcohol compound into the polymerization reactor system increases the weight ratio of the higher molecular weight component to the lower molecular weight component.

Embodiment 76

The method or process defined in embodiment 74 or 75, wherein introducing the alcohol compound into the polymerization reactor system has substantially no effect on the peak molecular weight of the lower molecular weight component.

Embodiment 77

The method or process defined in any one of embodiments 74-76, wherein introducing the alcohol compound into the polymerization reactor system has substantially no effect on the peak molecular weight of the higher molecular weight component.

Embodiment 78

The method or process defined in any one of embodiments 74-77, wherein the first metallocene catalyst component produces the lower molecular weight component.

Embodiment 79

The method or process defined in any one of embodiments 74-78, wherein the second metallocene catalyst component produces the higher molecular weight component.

Embodiment 80

The method or process defined in any one of embodiments 1-79, wherein the alcohol compound is introduced into the polymerization reactor system continuously.

Embodiment 81

The method or process defined in any one of embodiments 1-79, wherein the alcohol compound is introduced into the polymerization reactor system periodically.

Embodiment 82

The method or process defined in any one of embodiments 1-81, wherein the weight ratio of the first metallocene catalyst component to the second metallocene catalyst component is in any range of weight ratios disclosed herein, e.g., from about 1:100 to about 100:1, from about 1:5 to about 5:1, from about 1:2 to about 2:1, etc.

Embodiment 83

The method or process defined in any one of embodiments 1-82, wherein introducing the alcohol compound into the polymerization reactor system has substantially no effect on the catalyst activity of the dual catalyst system (or substantially no effect on the production rate of the olefin polymer).

Embodiment 84

The method or process defined in any one of embodiments 1-83, wherein the MI of the olefin polymer decreases as the amount of the alcohol compound added to the polymerization reactor system increases.

Embodiment 85

The method or process defined in any one of embodiments 1-84, wherein the HLMI of the olefin polymer decreases as the amount of the alcohol compound added to the polymerization reactor system increases.

Embodiment 86

The method or process defined in any one of embodiments 1-85, wherein the Mw of the olefin polymer increases as the amount of the alcohol compound added to the polymerization reactor system increases.

Embodiment 87

The method or process defined in any one of embodiments 1-86, wherein the Mz of the olefin polymer increases as the amount of the alcohol compound added to the polymerization reactor system increases.

Embodiment 88

The method or process defined in any one of embodiments 1-87, wherein the Mz/Mw ratio of the olefin polymer decreases as the amount of the alcohol compound added to the polymerization reactor system increases.

Embodiment 89

The method or process defined in any one of embodiments 1-88, wherein introducing the alcohol compound into the polymerization reactor system has substantially no effect on the Mn of the olefin polymer.

We claim:
1. A method of controlling a polymerization reaction in a polymerization reactor system, the method comprising:
   (i) contacting a dual catalyst system with an olefin monomer and an optional olefin comonomer in the polymerization reactor system under polymerization conditions to produce an olefin polymer,
   wherein the dual catalyst system comprises a first metallocene catalyst component, a second metallocene catalyst component, an activator, and a co-catalyst; and
   (ii) introducing an amount of an alcohol compound into the polymerization reactor system to (I) reduce a melt index parameter of the olefin polymer; (II) increase a molecular weight parameter of the olefin polymer selected from Mw, Mz, or both; or (III) reduce a melt index parameter of the olefin polymer and increase a molecular weight parameter of the olefin polymer selected from Mw, Mz, or both.

2. The method of claim 1, wherein the alcohol compound comprises methanol, ethanol, propanol, butanol, pentanol, hexanol, heptanol, octanol, decanol, hexadecanol, cyclohexanol, phenol, benzyl alcohol, or a combination thereof.

3. The method of claim 1, wherein the dual catalyst system comprises:
   a first metallocene catalyst component comprising an unbridged metallocene compound containing zirconium;
   a second metallocene catalyst component comprising a bridged metallocene compound containing zirconium or hafnium;
   an activator comprising an activator-support, an aluminoxane compound, an organoboron or organoborate compound, an ionizing ionic compound, or any combination thereof; and
   a co-catalyst comprising an organoaluminum compound.

4. The method of claim 3, wherein:
   the activator comprises an activator-support comprising a fluorided solid oxide, a sulfated solid oxide, or a combination thereof;
   the amount of the alcohol compound introduced into the polymerization reactor system is in a range from about 1:10,000 to about 1:10, based on the moles of hydroxyl (—OH) groups of the alcohol compound to the weight of the activator-support in grams added to the polymerization reactor system; and
   the alcohol compound comprises a $C_1$ to $C_{12}$ hydrocarbyl alcohol.

5. The method of claim 1, wherein the polymerization reactor system comprises a slurry reactor, a gas-phase reactor, a solution reactor, or a combination thereof.

6. The method of claim 1, wherein the polymerization reactor system comprises a single reactor.

7. The method of claim 1, wherein the olefin monomer comprises ethylene and the olefin comonomer comprises a $C_3$-$C_{10}$ alpha-olefin.

8. The method of claim 1, further comprising:
   determining a MI, and adjusting the amount of the alcohol compound introduced into the polymerization reactor system based on the difference between the determined MI and a target MI;
   determining a HLMI, and adjusting the amount of the alcohol compound introduced into the polymerization reactor system based on the difference between the determined HLMI and a target HLMI;
   determining the Mw, and adjusting the amount of the alcohol compound introduced into the polymerization reactor system based on the difference between the determined Mw and a target Mw; or
   determining the Mz, and adjusting the amount of the alcohol compound introduced into the polymerization reactor system based on the difference between the determined Mz and a target Mz; or
   any combination thereof.

9. The method of claim 1, wherein:
   a weight ratio of the first metallocene catalyst component to the second metallocene catalyst component is in a range of from about 1:10 to about 10:1; and
   a weight ratio of the first metallocene catalyst component to the second metallocene catalyst component is substantially constant.

10. The method of claim 1, wherein:
    the co-catalyst comprises an organoaluminum compound; and
    the amount of the alcohol compound introduced into the polymerization reactor system is in a molar ratio range of from about 0.1:1 to about 0.9:1, based on the moles of hydroxyl (—OH) groups of the alcohol compound to the moles of the organoaluminum compound added to the polymerization reactor system.

11. The method of claim 1, wherein the amount of the alcohol compound introduced into the polymerization reactor system is in a molar ratio range of from about 10:1 to about 1000:1, based on the ratio of the moles of hydroxyl (—OH) groups of the alcohol compound to the total moles of the first metallocene catalyst component and the second metallocene catalyst component added to the polymerization reactor system.

12. The method of claim 1, further comprising:
    a step of adjusting a weight ratio of the first metallocene catalyst component to the second metallocene catalyst component; or
    a step of adding hydrogen to the polymerization reactor system to adjust the molecular weight parameter, the melt index parameter, or both the molecular weight parameter and the melt index parameter; or
    both.

13. A process for producing an olefin polymer with a target melt index parameter, a target molecular weight parameter, or a target melt index parameter and a target molecular weight parameter, the process comprising:
    (a) contacting a dual catalyst system with an olefin monomer and an optional olefin comonomer in a polymerization reactor system under polymerization conditions,
    wherein the dual catalyst system comprises a first metallocene catalyst component, a second metallocene catalyst component, an activator, and a co-catalyst; and
    (b) controlling an amount of an alcohol compound introduced into the polymerization reactor system to produce the olefin polymer with the target melt index parameter, the target molecular weight parameter, or the target melt index parameter and the target molecular weight parameter; wherein:

the melt index parameter is MI, HLMI, or both; and the molecular weight parameter is Mw, Mz, or both.

14. The process of claim 13, wherein the olefin polymer has:
- a melt index (MI) of less than about 10 g/10 min;
- a number-average molecular weight (Mn) in a range from about 5,000 to about 40,000 g/mol;
- a weight-average molecular weight (Mw) in a range from about 100,000 to about 600,000 g/mol; or
- a Mw/Mn ratio in a range from about 10 to about 40; or any combination thereof.

15. The process of claim 14, wherein the alcohol compound comprises a $C_1$ to $C_8$ alkyl alcohol, and the olefin polymer is an ethylene/α-olefin copolymer.

16. The process of claim 13, wherein the MI and HLMI of the olefin polymer decrease as the amount of the alcohol compound added to the polymerization reactor system increases.

17. The process of claim 13, wherein the Mw and Mz of the olefin polymer increase as the amount of the alcohol compound added to the polymerization reactor system increases.

18. The process of claim 13, wherein the olefin polymer comprises a higher molecular weight component and a lower molecular weight component, and wherein:
- a weight ratio of the higher molecular weight component to the lower molecular weight component increases as the amount of the alcohol compound added to the polymerization reactor system increases;
- a peak molecular weight of the lower molecular weight component is substantially unchanged as the amount of the alcohol compound added to the polymerization reactor system increases; or
- a peak molecular weight of the higher molecular weight component is substantially unchanged as the amount of the alcohol compound added to the polymerization reactor system increases; or
- any combination thereof.

19. The process of claim 13, wherein:

the polymerization reactor system comprises a loop slurry reactor;

the alcohol compound comprises isopropyl alcohol; and the olefin polymer is an ethylene/1-hexene copolymer.

20. The process of claim 19, wherein the dual catalyst system comprises:
- a first metallocene catalyst component comprising an unbridged metallocene compound containing zirconium;
- a second metallocene catalyst component comprising a bridged metallocene compound containing zirconium or hafnium;
- an activator-support comprising a solid oxide treated with an electron-withdrawing anion; and
- an organoaluminum compound.

* * * * *